United States Patent
Lehmann et al.

(10) Patent No.: US 12,528,914 B2
(45) Date of Patent: Jan. 20, 2026

(54) BRANCHED POLYESTER SILOXANES

(71) Applicant: Evonik Operations GmbH, Essen (DE)

(72) Inventors: Kathrin Lehmann, Leverkusen (DE); Frauke Henning, Essen (DE); Stefan Busch, Bochum (DE); Angela Nawracala, Bergisch Gladbach (DE)

(73) Assignee: Evonik Operations GmbH, Essen (DE)

( * ) Notice: Subject to any disclaimer, the term of this patent is extended or adjusted under 35 U.S.C. 154(b) by 853 days.

(21) Appl. No.: 17/632,894

(22) PCT Filed: Aug. 3, 2020

(86) PCT No.: PCT/EP2020/071781
§ 371 (c)(1),
(2) Date: Feb. 4, 2022

(87) PCT Pub. No.: WO2021/023701
PCT Pub. Date: Feb. 11, 2021

(65) Prior Publication Data
US 2022/0282045 A1 Sep. 8, 2022

(30) Foreign Application Priority Data
Aug. 8, 2019 (EP) .................................. 19190670

(51) Int. Cl.
*C08G 77/445* (2006.01)
*C08G 77/00* (2006.01)

(52) U.S. Cl.
CPC ........... *C08G 77/445* (2013.01); *C08G 77/70* (2013.01)

(58) Field of Classification Search
CPC ....... C08G 77/445; C08G 77/70; C08L 63/00; C08L 2312/00; C08L 2205/03; C09D 163/00
See application file for complete search history.

(56) References Cited

U.S. PATENT DOCUMENTS 4,613,641 A    9/1986  Haubennestel et al.
5,179,142 A    1/1993  Ono et al.
(Continued)

FOREIGN PATENT DOCUMENTS

CN    102372852    3/2012
EP    1640418      6/2007
(Continued)

OTHER PUBLICATIONS

European Search Report issued Dec. 19, 2019 in European Application No. 19190670.0, 5 pages.
(Continued)

*Primary Examiner* — Shane Fang
(74) *Attorney, Agent, or Firm* — Grüneberg and Myers PLLC

(57) ABSTRACT

Polyester-modified, branched organosiloxanes can be used as plastics additives. Corresponding plastics compositions contain at least one plastics additive (A) and at least one plastic (B). The at least one plastics additive (A) can be one or more polyester-modified, branched organosiloxanes. Moulding compounds or shaped bodies can contain this plastics composition. The plastics composition, the moulding compounds, and the shaped bodies are useful.

18 Claims, 1 Drawing Sheet

(56) References Cited

U.S. PATENT DOCUMENTS

| | | | | |
|---|---|---|---|---|
| 2012/0010302 | A1 | 1/2012 | Hartung et al. | |
| 2012/0251729 | A1* | 10/2012 | Horstman | C09D 163/00 427/386 |
| 2013/0217907 | A1* | 8/2013 | Henning | C08G 77/70 556/450 |
| 2014/0309446 | A1* | 10/2014 | Amajjahe | A61Q 5/02 556/418 |
| 2015/0080593 | A1* | 3/2015 | Henning | C08G 77/388 556/423 |
| 2018/0134850 | A1* | 5/2018 | Knott | C08L 83/04 |

FOREIGN PATENT DOCUMENTS

| | | |
|---|---|---|
| EP | 2404950 | 1/2012 |
| JP | 2003-96172 A | 4/2003 |
| KR | 10-2003-0022329 A | 3/2003 |
| WO | 86/04072 | 7/1986 |
| WO | 2009/065644 | 5/2009 |
| WO | 2011/129596 | 10/2011 |
| WO | 2012/034821 | 3/2012 |
| WO | 2017/191603 | 11/2017 |

OTHER PUBLICATIONS

Ralph Hanselmann, "Duroplaste", Thieme Römpp, with partial English translation, 4 pages.
International Search Report issued Oct. 13, 2020 in PCT/EP2020/071781, with English translation, 5 pages.
Walter Noll, Chemie Und Technologie Der Silicone [Chemistry and Technology of the Silicones], Verlag Chemie GmbH, Weinheim, 1960, 8 pages.
Written Opinion issued Oct. 13, 2020 in PCT/EP2020/071781, with English translation, 9 pages.
Office Action received for Chinese Patent Application No. 202310863899.9, mailed on Feb. 19, 2025, 27 pages with English translation.

* cited by examiner

BRANCHED POLYESTER SILOXANES

CROSS-REFERENCE TO RELATED APPLICATIONS

This application is the National Stage entry under § 371 of International Application No. PCT/EP2020/071781, filed on Aug. 3, 2020, and which claims the benefit of priority to European Application No. 19190670.0, filed on Aug. 8, 2019. The content of each of these applications is hereby incorporated by reference in its entirety.

BACKGROUND OF THE INVENTION

The present invention relates to the use of polyester-modified, branched organosiloxanes as plastics additives; to corresponding plastics compositions comprising at least one plastics additive (A) selected from polyester-modified, branched organosiloxanes and at least one plastic (B); to moulding compounds or shaped bodies comprising this plastics composition; and also to the numerous uses of the plastics composition, the moulding compounds and the shaped bodies.

DESCRIPTION OF RELATED ART

Plastics additives are known from the prior art. They are used to improve the properties of plastics compositions or to facilitate the production or processing of plastics compositions. The use of organosiloxanes has proven to be particularly advantageous. The chemical structure of the organosiloxanes plays a decisive role here in the action of the organosiloxanes. It is known, for example, from the prior art that organosiloxanes which bear polyester or polyether groups, what are known as polyester-/polyether-modified organosiloxanes, are particularly advantageous.

WO 86/04072 A1 by way of example discloses polysiloxane-polylactone block copolymers in which the polyester radicals are bonded at the α,ω position of a linear, that is to say unbranched, polysiloxane. Advantages in the surface modification of various thermoplastics within the context of an antiblocking effect are disclosed. The products obtained are described as precursors for thermoplastic elastomers or as anhydride-curable materials in epoxides.

EP 1640418 A1 discloses the use of organomodified polysiloxanes for improving surface finish, scratch resistance and abrasion resistance of thermoplastic elastomers. These are comparatively soft plastics. Examples of thermoplastic elastomers mentioned are polyurethanes (TPU), copolyesters (TPEE/COPE) and styrenols (TPE-S) and also polyamides (PEBA), polyolefin mixtures (TPO), and polyolefin alloys (TPV). The organomodified polysiloxanes described are exclusively polyether-modified organosiloxanes. Polyether-modified organosiloxanes have a number of disadvantages compared to polyester-modified organosiloxanes. For instance, polyether-modified organosiloxanes generally display lower temperature stability. In the case of relatively high processing temperatures, as are required for example for the processing of polymethyl methacrylate (PMMA), undesired discolourations/yellowing can thus occur. In addition, polyether-modified organosiloxanes lead to an increase in the opacity of plastics compositions. This is especially disadvantageous for highly transparent PMMA compositions. Polyether-modified organosiloxanes can in addition not be used for the production of polyolefin-based films, since smooth films are typically not obtained, which is evident even at low additions of 0.5% by weight. Here, too, yellowing frequently occurs in polyolefin films.

WO 2012/034821 A1 discloses polyester siloxanes in which the polyester radicals are bonded at the α,ω position or in lateral positions on a linear, and thus unbranched, polysiloxane. These polyester siloxanes are likewise used for surface modification in the context of improving the wipe resistance of coloured poly(alkyl) (meth)acrylate matrix materials. However, the improved wipe resistance is accompanied by the disadvantage of a reduction of the Vicat softening temperature. In particular, the use of commercially available plastics additives such as TEGOMER® H-Si 6440 P, a corresponding polyester-modified organosiloxane, and also TEGOPREN® 6846, an alkyl-modified organosiloxane, is described. These are reported to lead to reduced or even no grey haze in coloured, in particular black moulding compounds, at least on visual assessment of the samples.

WO 2011/129596 A1 likewise describes polyester siloxanes in which the polyester radicals are bonded at the α,ω position of a linear, that is to say unbranched, polysiloxane. These polyester siloxanes are used for improving the scratch resistance of polymethyl methacrylate (PMMA) which additionally contains impact modifiers. An improved impact resistance of the plastics composition is described as a combined effect of the impact modifier and of the TEGOMER® H-Si 6440 P organosiloxane used.

Linear organosiloxanes that are polyester-modified in α,ω position, in particular TEGOMER® H-Si 6440 P, are therefore described in the prior art as particularly advantageous for the surface modification of plastics compositions, in particular for improving the scratch resistance, wipe resistance or impact resistance thereof. However, it is apparent that the use thereof in numerous plastics, such as for example polymethyl methacrylate (PMMA), polycarbonate (PC), polyurethane (TPU), polyethylene terephthalate (PET) or polyethylene (PE), leads to clouding, that is to say an increase in the opacity or a reduction in the transparency, or else leads to others of the abovementioned disadvantages, such as for example to a reduction in the softening temperature. In addition, an improved but still measurable reduction in the colour depth of black compounds based on PC or PMMA is observed with these organosiloxanes.

There was therefore still a need for plastics additives which are capable both of positively modifying the surface properties and also the bulk properties of plastics and, as a result of an improved compatibility with the plastic, enable plastics which are transparent or coloured in dark shades and have high gloss to be allowed.

In particular, there was still a need for plastics additives for high-performance plastics which enable an improved flowability and scratch and wipe resistance in poly(alkyl) (meth)acrylates, polyethylene terephthalates and polycarbonates without reducing the softening temperature (Vicat).

There was also a need for plastics additives which do not lead to transesterification or transamidation in high-performance plastics based on polymers having ester or amide groups, such as for example polyesters (e.g. polybutylene terephthalate (PBT), polyethylene terephthalate (PET)), polycarbonates (PC) or polyamides (PA) (e.g. PA 6, PA 6.6, PA 4.6, PA 11, PA 12, polyphthalamides (PPAs)). This can result in a reduced softening temperature or a deterioration in mechanical properties, such as a reduced impact resistance. Transesterification or transamidation reactions are frequently also evident in the DSC (differential scanning calorimetry). Stability against undesired degradation processes is therefore desirable.

By overcoming the aforementioned disadvantages, novel automobile applications can be addressed, as are required in particular in electromobility, in order to injection-mould batteries or structural elements. E+E applications (electrical and electronic applications) can also be addressed, for example heatsinks as metal substitute for electronic components, filled with epoxy resins, polyurethanes or silicones. Not only are good mechanical properties required in E+E applications, the plastics compositions are also intended to display sufficient tracking resistance (Comparative Tracking Index, CTI), so that short-circuits can be avoided at low voltages, and are also intended to have high flame resistance.

None of the aforementioned documents of the prior art describes the use of organosiloxanes for improving flame resistance, as stipulated for example by European transport standard EN 45545 or the CPR implementation of construction guidelines, which in addition to a flame resistance in accordance with UL 94 also require reduced smoke gas density and delayed release of heat.

SUMMARY OF THE INVENTION

The object of the present invention was that of overcoming at least one disadvantage of the prior art.

The object in particular was that of providing correspondingly improved plastics compositions. Preferably, plastics compositions should be provided which depending on the field of use display at least one of the following improvements:
- improved mechanical properties, such as for example improved impact resistance;
- improved surface properties, such as for example scratch or wipe resistance (abrasion resistance);
- improved thermal properties, for example a high softening temperature or improved flowability;
- improved optical properties, for example improved gloss, improved transparency, low grey haze or improved colour depth;
- improved stability against undesired degradation processes;
- improved electrical properties, for example sufficient tracking resistance;
- improved flame and fire properties, for example improved flame resistance, reduced smoke gas density or delayed release of heat.

Further objects that are not mentioned explicitly will become apparent from the overall context of the following description and examples.

Surprisingly, it has now been found that a plastics composition comprising
- at least one plastics additive (A) selected from polyester-modified, branched organosiloxanes;
- at least one plastic (B), achieves this object.

Surprisingly, it has been found that the plastics additives (A) of the present invention, with their novel structural element of the branch in the siloxane backbone and optionally also an additional branch in the polyester radical, impart properties which cannot be achieved by terminally modified (that is to say modified in α,ω position) or laterally modified, linear polyester siloxanes without a branch in the siloxane backbone.

The object of the present invention was therefore achieved by the subject-matter as described. Advantageous configurations of the invention are specified in the examples and the description.

The subject-matter of the invention will be described by way of example below, without any intention that the invention be restricted to these illustrative embodiments. Where ranges, general formulae or classes of compounds are specified below, these are intended to encompass not only the corresponding ranges or groups of compounds which are explicitly mentioned but also all subranges and subgroups of compounds which can be obtained by removing individual values (ranges) or compounds. Where documents are cited within the context of the present description, the entire content thereof is intended to be part of the disclosure content of the present invention.

Where average values are reported hereinafter, these values are numerical averages unless stated otherwise. Where measurement values, parameters or material properties determined by measurement are reported hereinafter, these are, unless otherwise stated, measurement values, parameters or material properties which are measured at 25° C. and also preferably at a pressure of 101 325 Pa (standard pressure).

Where numerical ranges in the form "X to Y" are reported hereinafter, where X and Y represent the limits of the numerical range, this is synonymous with the statement "from at least X up to and including Y", unless otherwise stated. Statements of ranges thus include the range limits X and Y, unless stated otherwise.

The designations "polyester-modified siloxane", "polyester-modified organosiloxane" and "polyester siloxane" are used synonymously within the context of the present invention.

Wherever molecules/molecule fragments have one or more stereocentres or can be differentiated into isomers on account of symmetries or can be differentiated into isomers on account of other effects, for example restricted rotation, all possible isomers are included by the present invention.

In connection with this invention, the word fragment "poly" encompasses not just exclusively compounds having at least 2, especially 3, repeating units of one or more monomers in the molecule, but preferably also those compositions of compounds which have a molecular weight distribution and at the same time have an average molecular weight of at least 200 g/mol. This definition takes account of the fact that it is customary in the field of industry in question to refer to such compounds as polymers even if they do not appear to conform to a polymer definition as per OECD or REACH guidelines.

The various fragments in the formulae below may be distributed statistically. Statistical distributions are of blockwise construction with any desired number of blocks and with any desired sequence or are subject to a randomized distribution; they may also have an alternating construction or else form a gradient over the chain, where one is present; in particular they can also form all mixed forms in which groups with different distributions may optionally follow one another.

The formulae below describe compounds that are constructed from repeating units, for example repeating fragments, blocks or monomer units, and may have a molar mass distribution. The frequency of the repeating units is reported by indices. The indices used in the formulae should be regarded in particular as statistical averages (number averages) The indices used and also the value ranges of the reported indices are thus understood to be averages of the possible statistical distribution of the structures that are actually present and/or mixtures thereof. The indices are therefore integers for pure substances and are generally fractional numbers for mixtures.

Specific embodiments may lead to restrictions of the statistical distributions as a result of the embodiment. There is no change in the statistical distribution for all regions unaffected by the restriction.

The invention firstly provides a plastics composition comprising
at least one plastics additive (A) selected from polyester-modified, branched organosiloxanes; and
at least one plastic (B).

Here, the plastic (B) is different from the plastics additive (A). The plastics composition thus contains both at least one plastics additive (A) and at least one plastic (B) that is different therefrom.

The invention accordingly further provides for the use of polyester-modified, branched organosiloxanes as plastics additive.

An organosiloxane is understood to mean a compound having organic radicals bonded to silicon atoms and also structural units of the formula ≡Si—O—Si≡, where "≡" represents the three remaining valencies of the silicon atom in question. The organosiloxanes are in this case preferably composed of units selected from the group consisting of $M=[R_3SiO_{1/2}]$, $D=[R_2SiO_{2/2}]$ and $T=[RSiO_{3/2}]$, and optionally additionally have units of the formula $Q=[SiO_{4/2}]$, where R is a monovalent organic radical. The radicals R may each be selected independently of one another here and are identical or different when compared in pairs. Linear organosiloxanes are composed of two M units and optionally additional D units, but do not contain any T or Q units. In contrast, branched organosiloxanes, in addition to M units and optionally additional D units, mandatorily contain at least one T unit or Q unit. Cited as a reference in relation to the M, D, T, Q nomenclature used to describe the units of organosiloxanes is W. Noll, Chemie and Technologie der Silicone [Chemistry and Technology of the Silicones], Verlag Chemie GmbH. Weinheim (1960), page 2 ff. Polyester-modified organosiloxanes are distinguished by the fact that at least one radical R comprises a polyester radical, that is to say a radical having at least two carboxylic ester groups.

It is preferable here for the at least one plastics additive (A) to be selected from compounds of formula (1),

  formula (1);

where
$M=[R_3SiO_{1/2}]$;
$D=[R_2SiO_{2/2}]$;
$T=[RSiO_{3/2}]$;
$Q=[SiO_{4/2}]$;
in which
R is in each case independently selected from the group consisting of $R^{(I)}$ and $R^{(II)}$;
wherein
$R^{(I)}$ is in each case independently selected from monovalent hydrocarbon radicals;
$R^{(II)}$ is in each case independently selected from monovalent organic radicals each bearing one or more polyester radicals;
where in addition:
$m=2+t+2\times q \geq 3$;
$d \geq 0$;
$t \geq 0$;
$q \geq 0$;
with the proviso that at least one radical $R^{(II)}$ is present.

It is further preferable for the plastics additive (A) to be selected from compounds of formula (2),

  formula (2);

where
$M=[R_3SiO_{1/2}]$;
$D=[R_2SiO_{2/2}]$;
$T=[RSiO_{3/2}]$;
$Q=[SiO_{4/2}]$;
in which
R is in each case independently selected from the group consisting of $R^{(I)}$ and $R^{(II)}$;
wherein
$R^{(I)}$ is in each case independently selected from monovalent hydrocarbon radicals;
$R^{(II)}$ is in each case independently selected from monovalent organic radicals each bearing one or more polyester radicals;
where in addition:
$m=2+t+2\times q=3$ to 60, preferably 3 to 20, especially 3 to 10;
$d=0$ to 120, preferably 10 to 50, especially 15 to 40;
$t=0$ to 10, preferably 1 to 7, especially 1 to 5;
$q=0$ to 10, preferably 0 to 5, especially 0 to 1;
with the proviso that the organosiloxane has at least one, preferably 2 to 10, especially 3 to 7 radicals $R^{(II)}$).

It is further preferable for the plastics additive (A) to be selected from compounds of formula (3),

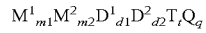  formula (3);

where
$M^1=[R^1_3SiO_{1/2}]$;
$M^2=[R^2R^1_2SiO_{1/2}]$;
$D^1=[R^1_2SiO_{2/2}]$;
$D^2=[R^1R^2SiO_{2/2}]$;
$T=[R^1SiO_{3/2}]$;
$Q=[SiO_{4/2}]$;
in which
$R^1$ is in each case independently selected from hydrocarbon radicals having 1 to 30 carbon atoms,
$R^2$ is in each case independently selected from monovalent organic radicals of formula (4),

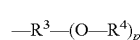  formula (4);

$R^3$ is in each case independently selected from (p+1)-valent organic radicals having 2 to 10 carbon atoms;
$R^4$ is in each case independently selected from monovalent polyester radicals having 4 to 1000 carbon atoms,
m1=0 to 30, preferably 0 to 10, especially 0 to 3;
m2=0 to 30, preferably 0 to 10, especially 0 to 7;
d1=0 to 100, preferably 10 to 40, especially 24 to 34;
d2=0 to 20, preferably 0 to 10, especially 0 to 3;
t=0 to 10, preferably 1 to 7, especially 1 to 5;
q=0 to 10, preferably 0 to 5, especially 0 to 1;
p=1 to 4, preferably 1 to 3, especially 1 to 2;
with the proviso that:
m1+m2=2+t+2×q=3 to 60, preferably 3 to 20, especially 3 to 10;
m2+d2=at least 1, preferably 2 to 10, especially 3 to 7.

It is particularly preferable here for m1=0. It is furthermore particularly preferable for m2≥3.

It is also preferable for the following to apply for the compounds of formula (3)
$R^4$ is in each case independently selected from polyester radicals of formulae (5a) or (5b),

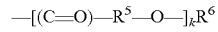  formula (5a),

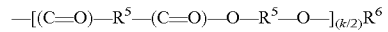  formula (5b), wherein
R⁵ is in each case independently selected from divalent hydrocarbon radicals having 2 to 10 carbon atoms;
R⁶ is in each case independently selected from the group consisting of H, alkyl radicals having 1 to 4 carbon atoms and acyl radicals having 1 to 4 carbon atoms;
k=2 to 50, preferably 4 to 40, especially 6 to 30.

It is particularly preferable for the radicals R⁴ to in each case independently be selected from polyester radicals of formula (5a).

The polyester radicals may have been formed from identical or different starting molecules. The polyester radicals have preferably been formed from identical starting molecules. The starting molecules are preferably selected from the group consisting of compounds having at least one carboxyl group and also at least one hydroxyl group (hydroxycarboxylic acids), lactones, organic compounds having at least two carboxyl groups and organic compounds having at least two hydroxyl groups.

It is preferable for the polyester radicals to be based on hydroxycarboxylic acids (or the corresponding lactones) selected from the group consisting of glycolic acid, lactic acid, 3-hydroxypropionic acid, 2-hydroxybutyric acid, 3-hydroxybutyric acid, 4-hydroxybutyric acid, hydroxyisobutyric acid, 3-hydroxyisobutyric acid, 2-hydroxyvaleric acid, 3-hydroxyvaleric acid, 4-hydroxyvaleric acid, 5-hydroxyvaleric acid, 2-hydroxycaproic acid, 3-hydroxycaproic acid 4-hydroxycaproic acid, 5-hydroxycaproic acid, 6-hydroxycaproic acid, 6-hydroxy-2,2,4-trimethylcaproic acid; preferably 5-hydroxyvaleric acid, 6-hydroxycaproic acid and/or 6-hydroxy-2,2,4-trimethylcaproic acid, especially 5-hydroxycaproic acid.

It is preferable for 5% to 50%, preferably 5% to 40%, especially 5% to 25% of the silicon atoms of the plastics additive (A) to bear one or more polyester radicals. The statement that a particular percentage of the silicon atoms of an organosiloxane are substituted in a particular manner relates to the molar proportion of all silicon atoms in the numerical statistical average of all molecules in the component in question, unless stated otherwise. The proportion of silicon atoms in the plastics additive (A) which bear one or more polyester radicals is given for compounds of formula (3) for example by the quotient (m2+d2)/(m1+m2+d1d2+t+q).

It is preferable for the radical R³ in formula (4) to consist of two hydrocarbon radicals R⁽ᵃ⁾ and R⁽ᵇ⁾ and also an oxygen atom, wherein R⁽ᵃ⁾ and R⁽ᵇ⁾ are joined to one another via the oxygen atom and wherein R⁽ᵃ⁾ is bonded to a silicon atom and R⁽ᵇ⁾ is not bonded to a silicon atom. It is particularly preferable here for R⁽ᵃ⁾ to be a saturated or unsaturated hydrocarbon radical having 2 to 4 carbon atoms, preferably 2 to 3 carbon atoms, and R⁽ᵇ⁾ to be a saturated hydrocarbon having 1 to 6 carbon atoms, preferably 2 to 6 carbon atoms.

It is further preferable here for the radical R³ in formula (4) to be selected from the group consisting of:

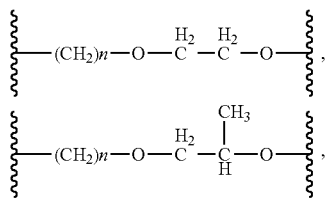

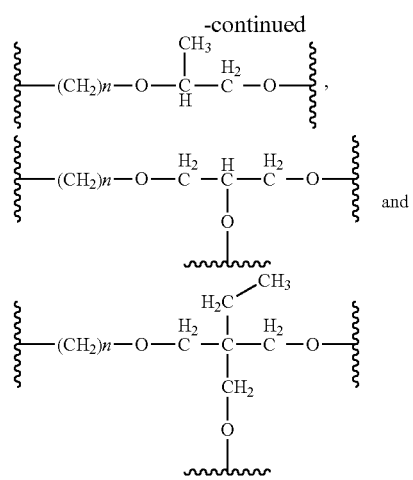

where n=2 to 4, preferably 2 to 3, especially 2.

The radicals R³ in this representation are bonded on the left to a silicon atom, whereas the remaining open valencies bear radicals R⁴.

It is particularly preferable for the radical R³ to in each case independently be selected from the group consisting of the radicals (a), (b) and (c):

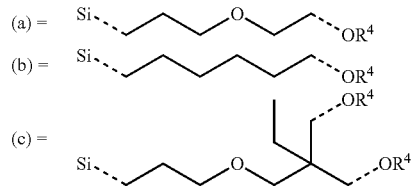

The polyester-modified, branched organosiloxanes used as plastics additive (A) are preferably prepared from hydroxy-functional organosiloxanes via reaction with lactones. This reaction of hydroxy-functional organosiloxanes with lactones is a ring-opening polymerization reaction. The lactones corresponding to the hydroxycarboxylic acids listed above may preferably be used here. Particular preference is given here to the reaction of hydroxy-functional organosiloxanes with ε-caprolactone, 3,5,5-trimethyl-ε-caprolactone and/or δ-valerolactone, even more preferably with ε-caprolactone and/or δ-valerolactone and especially with ε-caprolactone alone or in combination with δ-valerolactone.

It is preferable for 90% to 100% of the lactone groups, especially more than 99%, to be converted during the reaction of the at least one hydroxy-functional organosiloxane. The percentages here indicate the number of converted lactone groups divided by the number of lactone groups used. The conversion of the lactone groups, also called lactone conversion, can be determined using ¹H NMR spectroscopy, as described in the examples.

It is preferable to accelerate the ring-opening polymerization reaction by means of catalysis. Catalysts used are preferably metal carboxylates or metal alkoxides (metal alcoholates), preferably selected from the group consisting of tin carboxylates, zinc carboxylates, bismuth carboxylates, titanium alkoxides and zirconium alkoxides. The catalysts are particularly preferably selected from the group consisting of tin(II) 2-ethylhexanoate, zinc(II) stearate, zinc(II) neodecanoate, titanium(IV) butoxide, titanium(IV) ethoxide and zirconium(IV) butoxide.

The catalyst is preferably used in a proportion by mass of 0.01% to 2%, preferably from 0.1% to 1%, based on the total mass of the reactants, that is to say neglecting further unreactive constituents, such as for example solvents.

The reaction of the hydroxy-functional organosiloxane with lactones can be effected in the presence or absence, but preferably in the absence, of a solvent.

Preferably, the reaction product obtained is purified by subjecting it to a suitable thermal separation process. Thermal separation processes are known by this term to those skilled in the art and include all processes based on the establishment of a thermodynamic phase equilibrium. The thermal separation process is preferably selected from the group consisting of distillation, rectification, adsorption, crystallization, extraction, absorption, drying and freezing-out, particular preference being given to distillation and rectification. A preferred embodiment of the process therefore comprises, as a further process step, the distillation and/or purification of the reaction products. The distillation and/or purification can be effected, for example, by means of a rotary evaporator, preferably at a temperature of 20 to 250° C., more preferably 40 to 160° C. and particularly preferably 50 to 150° C., where the pressure is preferably from 0.0001 to 0.75 bar, even more preferably from 0.001 to 0.2 bar and particularly preferably from 0.01 to 0.1 bar. Distillation and/or purification is especially advantageous for removal of volatile constituents, especially of solvents.

The hydroxy-functional organosiloxanes used to prepare the compounds of formula (1), (2) and/or (3) differ from the compounds of formula (1), (2) and/or (3) merely in that $R^{(II)}$ is in each case independently selected from monovalent organic radicals which each bear one or more hydroxyl groups, or in that $R^4$=H.

The hydroxy-functional organosiloxane is optionally purified prior to the reaction thereof by subjecting it to a suitable thermal separation process.

The hydroxy-functional organosiloxane can in turn be prepared by hydrosilylation of an olefinically unsaturated compound having one or more hydroxyl groups with an SiH-functional branched organosiloxane.

The unsaturated compound having one or more hydroxyl groups is preferably selected from the group consisting of allyl glycols, such as allyloxyethanol or allyloxypropanol, or equivalents thereof having more than one glycol unit, such as diethylene glycol monoallyl ether or dipropylene glycol monoallyl ether, glycerol monoallyl ether, trimethylolpropane monoallyl ether, especially 2-allyloxyethanol. It is also possible to use 1-alkenols, such as for example 1-hexenol, or 2-butyne-1,4-diol and the corresponding alkoxylates, such as for example the corresponding ethoxylates (also referred to as butynediol EO or "BEO"), including in particular 1,4-di(2-hydroxyethoxy)-2-butyne.

In order to prepare the hydroxy-functional, branched organosiloxanes used to prepare the compounds of formula (1), (2) and/or (3), preference is given to using SiH-functional (that is to say hydrosilyl-functional) organosiloxanes which differ from the compounds of formula (1), (2) and/or (3) merely in that $R^{(II)}$=H or $R^2$=H.

The hydrosilylation is effected in the manner known to those skilled in the art.

The hydrosilylation in the process according to the invention is preferably catalysed with the aid of the platinum group catalysts familiar to those skilled in the art, more preferably with the aid of Karstedt catalysts.

The hydrosilylation can be effected in the presence or absence, preferably in the absence, of a solvent. Suitable organic solvents used are preferably toluene, xylene or isopropanol. The solvents used are preferably anhydrous. If the solvent has a reactive group, especially a hydroxyl group, this can lead to SiOC by-products to a minor degree.

It is preferable when more than 95%, further preferably more than 97%, especially 99% to 100%, of the SiH groups are converted during the hydrosilylation. The % figures indicate the number of converted SiH groups divided by the number of SiH groups used. Detection of the SiH groups is effected in a manner familiar to those skilled in the art, preferably by gas-volumetric means after alkaline breakdown. This may involve, for example, reacting a sample of the reaction mixture with a butanolic sodium butoxide solution (sodium butoxide content: 5% by weight) and concluding the amount of SiH functions still present from the amount of hydrogen formed.

The at least one SiH-functional, branched organosiloxane is optionally purified prior to the hydrosilylation by subjecting it to a suitable thermal separation process.

The SiH-functional, branched organosiloxanes may also be obtained by known methods by means of equilibration. The preparation of SiH-functional, branched organosiloxanes by means of equilibration with trifluoromethanesulfonic acid is described, for example, in WO 2009/065644 A1.

The preparation of the polyester-modified, branched organosiloxanes is preferably carried out such that it comprises two process steps, specifically:

1. preparing a hydroxy-functional organosiloxane by hydrosilylation of an olefinically unsaturated compound having one or more hydroxyl groups with an SiH-functional, branched organosiloxane; and
2. reacting the hydroxy-functional organosiloxane with a lactone.

The process steps can in this case be conducted as successive, separately performed steps, in each case as a one-pot reaction or else under metering control (dose-controlled), but preferably under metering control. The reaction can be conducted in a batchwise, semibatchwise or continuous process. Particular preference is given to metering-controlled reaction in the first process step.

The process can be effected in the presence or absence of a solvent. Suitable organic solvents used for the first process step are preferably toluene, xylene or 2-propanol. Suitable organic solvents used for the second process step are preferably aprotic solvents such as toluene, xylene or esters. However, the first and second process step are particularly preferably conducted in the absence of solvent.

Preference is given to conducting the process at a temperature from 10° C. to 160° C., preferably from 40° C. to 150° C., especially from 70° C. to 145° C. It is further preferable for the process to be conducted at a pressure from 0.5 to 20 bar, preferably 1 to 5 bar, especially preferably at standard pressure. The process can be conducted either in daylight or with exclusion of light, preferably in daylight. The process can moreover be conducted either under inert conditions (nitrogen, argon) or under an oxygen and/or air atmosphere, preferably under a nitrogen atmosphere.

The invention therefore further provides a plastics additive (A) which is obtainable by the process detailed above.

It is preferable for the proportion by mass of the total amount of all plastics additives (A) to be from 0.02% to <50.00%, preferably from 0.05% to 10.00%, especially from 0.10% to 5.00%, based on the total mass of the plastics composition according to the invention.

According to the invention, in addition to the at least one plastics additive (A), the plastics composition also additionally comprises at least one plastic (B).

It is preferable for the at least one plastic (B) to be selected from the group consisting of thermoplastics and thermosets, preferably from the group consisting of thermoplastics. "Thermoplastics" refers here to those polymers which have a flow transition range above the use temperature. Thermoplastics are linear or branched polymers which in principle become free-flowing above the glass transition temperature (Tg) in the case of amorphous thermoplastics and above the melting temperature (Tm) in the case of (semi)crystalline thermoplastics. In the softened state they can be processed into mouldings by compression, extrusion, injection moulding, or other shaping processes. Chain mobility becomes so great here that the polymer molecules slide easily against one another and the material reaches the molten state (flow range, polymer melt). The thermoplastics furthermore also include thermoplastically processable plastics with pronounced entropy-elastic properties known as thermoplastic elastomers. The thermoplastics include all plastics composed of polymer molecules that are linear or that have been crosslinked in a thermally labile manner, examples being polyolefins, vinyl polymers, polyesters, polyacetals, polyacetates, polycarbonates, and also some polyurethanes and ionomers, and also TPEs—thermoplastic elastomers (RÖMPP ONLINE, vers. 4.0, Carlowitz and Wierer, Kunststoffe (Merkblätter) [Plastics (Datasheets)], Chapter 1, Thermoplaste [Thermoplastics], Berlin: Springer Verlag (1987), Domininghaus, p. 95 ff.).

If a thermoplastic is selected as plastic (B), it is preferable for the thermoplastic to be selected from the group consisting of acrylonitrile-butadiene-styrene (ABS), polyamide (PA), polylactate (PLA), poly(alkyl) (meth)acrylate, polymethyl methacrylate (PMMA), polycarbonate (PC), polyethylene terephthalate (PET), polyethylene (PE), polypropylene (PP), polystyrene (PS), polyether ether ketone (PEEK), polyvinyl chloride (PVC), and thermoplastic elastomers (TPE), wherein the thermoplastic elastomers are preferably selected from the group consisting of thermoplastic polyamide elastomers (TPA, TPE-A), thermoplastic copolyester elastomers (TPC, TPE-E), thermoplastic elastomers based on olefins (TPO, TPE-O), thermoplastic styrene block copolymers (TPS, TPES), thermoplastic polyurethanes (TPU), thermoplastic vulcanizates (TPV, TPE-V) and crosslinked thermoplastic elastomers based on olefins (TPV, TPE-V).

In this case, the expression "(meth)acryl" represents both "methacryl" and/or "acryl" and the expression "poly(alkyl) (meth)acrylate" represents a homopolymer or copolymer of alkyl (meth)acrylates and optionally further monomers.

In a likewise preferred embodiment, plastic (B) is selected from the group consisting of thermosets.

Thermosets are plastics which are formed from oligomers (technically: prepolymers), less commonly from monomers or polymers, by irreversible and dense crosslinking via covalent bonds. The word "thermoset" is used here both for the raw materials prior to crosslinking (see reactive resins) and as a collective terms for the cured, mostly completely amorphous resins. Thermosets are energy-elastic at low temperatures, and even at higher temperatures they are not capable of viscous flow, but instead exhibit elastic behaviour with very restricted deformability. Thermosets include inter alfa the industrially important substance groups of the diallyl phthalate resins (DAP), epoxy resins (EP), urea-formaldehyde resins (UF), melamine-formaldehyde resins (MF), melamine-phenol-formaldehyde resins (MPF), phenol-formaldehyde resins and unsaturated polyester resins (UPES) (RÖMPP ONLINE, vers. 3.7, Becker, G. W.; Braun, D.; Woebcken, W., Kunststoff-Handbuch [Plastics Handbook], vol. 10: Duroplaste [Thermosets], 2nd Edn.; Hanser: Munich, (1988); Elias (6th) 1, 7, 476 ff.)

If a thermoset is selected as plastic (B), it is preferable for the thermoset to be selected from the group consisting of diallyl phthalate resins (DAP), epoxy resins (EP), urea-formaldehyde resins (UF), melamine-formaldehyde resins (MF), melamine-phenol-formaldehyde resins (MPF), phenol-formaldehyde resins (PF), unsaturated polyester resins (UP), vinyl ester resins and polyurethanes (PU).

It is preferable for the proportion by mass of the total amount of all plastics (B) to be from >50.00% to 99.98%, preferably from 90.00% to 99.95%, especially from 95.00% to 99.90%, based on the total mass of the plastics composition according to the invention.

It is preferable for the plastics composition to contain further additions selected from the group consisting of colourants, such as for example pigments or dyes, light stabilizers, UV stabilizers, heat stabilizers, UV absorbers, IR absorbers, antimicrobial active substances, inorganic or organic flame retardants, thermal stabilizers, antioxidants, crosslinking additives and polymers, fibre-reinforcing additives with an organic or inorganic basis, such as for example cellulose fibres, flax fibres, bamboo fibres, glass fibres or carbon fibres, antistatic additives, impact modifiers, odour absorbers, additives and polymers for improved barrier properties, inorganic and organic fillers and also auxiliaries. These additives are known to those skilled in the art.

The plastics compositions according to the invention preferably contain the abovementioned further additions in a proportion by mass of at most 10%, preferably at most 5% and especially at most 2%.

The invention further provides a moulding compound or shaped body comprising a plastics composition according to the invention. This includes mouldings, workpieces, semi-finished products, films, fibres and finished parts.

Plastics compositions in which the plastics (B) are selected from thermoplastics can be produced in various mixing units such as for example twin-screw extruders, BUSS kneaders, on a roll and in other units known to those skilled in the art by melting the thermoplastic and the plastics additive (A) and can subsequently be used directly or in a separate process for producing a shaped body or component. Such processes may for example be, without being limited to these: injection moulding, extrusion of profiles, sheets, films, and also thermoforming processes.

The resulting component is frequently also referred to as a shaped body, the term component or shaped body not being limited to thermoplastics compositions. The invention further provides multipart components produced from the additional use of the plastics composition according to the invention, such as for example co-extruded or laminated multilayer sheets or films or components in multicomponent injection moulding. The invention also provides those multipart components in which the plastics additive (A) is not present in the thermoplastic component, but rather is part of a coating of the thermoplastic component. For example, the plastics additive (A) may be present in a thin-layer, over-moulded thermally curing layer. The materials for this "IMC process" (IMC=in mould coating) are produced in this case for example on the basis of polyurethane, polyurea, crosslinking polyesters or crosslinking acrylate diols and other materials. In the IMC process, the plastics components are coated in the mould during the production using what are called negative moulds. The IMC process dispenses with a time-consuming and cost-intensive subsequent coating of the plastics components.

There are numerous fields of application for the plastics composition according to the invention.

The invention therefore further provides for the use of the plastics composition according to the invention or of the moulding compound according to the invention or of the shaped body according to the invention for the production of decorative covering panels, add-on parts, interior components or exterior components in motor vehicles, boats, aircraft, wind turbine blades, consumer electronics and also household appliances and medical-technical products.

The invention also further provides for the use of the plastics composition according to the invention or of the moulding compound according to the invention or of the shaped body according to the invention for the production of kitchen or laboratory work surfaces, films, fibres, profile strips, decorative strips, cables.

The plastics composition according to the invention and/or the moulding compound according to the invention and/or the shaped body according to the invention can be used in numerous manufacturing processes, such as are preferably described in the standard DIN 8580:2003-09. The plastics composition and/or the moulding compound according to the invention and/or the shaped body according to the invention are in particular used here in primary forming processes and/or shaping processes. For instance, semifinished products and/or finished products comprising the plastics composition according to the invention can be produced for example by primary forming processes and/or shaping processes.

The invention therefore further provides for the use of the plastics composition according to the invention or of the moulding compound according to the invention or of the shaped body according to the invention in primary forming processes selected from the group consisting of primary forming from the liquid state and primary forming from the plastic state; preferably selected from the group consisting of gravity casting, die casting, low-pressure casting, centrifugal casting, dip moulding, primary forming of fibre-reinforced plastics, compression moulding, injection moulding, transfer moulding, extrusion moulding, extrusion, drape forming, calendering, blow moulding and modelling. These primary forming processes are described for example in standard DIN 8580.2003-09.

The invention therefore also further provides for the use of the plastics composition according to the invention or of the moulding compound according to the invention or of the shaped body according to the invention in shaping processes selected from the group consisting of deep drawing and thermoforming. Suitable shaping processes are described for example in standard DIN 8580:2003-09.

The invention further provides for the use of the plastics composition according to the invention or of the moulding compound according to the invention or of the shaped body according to the invention in 3D printing, preferably in a melt layering process, also referred to as Fused Deposition Modeling® (FDM) or fused filament fabrication (FFF).

The branched polyester siloxanes used as plastics additives (A) exhibit good miscibility with molten thermoplastics or uncured, viscous thermosets, for example based on epoxides, polyurethanes, polyureas, unsaturated polyesters, vinyl ester resins, crosslinking acrylate resins based on monomers or monomeric and polymeric resin mixtures. They are therefore blendable/miscible in the reactor with molten thermoplastics or viscous thermosets and in the case of hardened thermoplastics or thermosets exhibit good compatibility with the plastic.

In contrast, when using linear polyester siloxanes there is virtually no miscibility in the case of compositions which cure to give thermosets. Miscibility with the resin or the resin-hardener mixture of the thermoset is practically nonexistent even when using mixing units such as for example a dissolver. This is reflected for example in phase separation of the additives, in what is known as fouling in the reactor when producing the formulation or in the formation of a lubricating film with reduced gloss. Astonishingly, the branched polyester siloxanes do not exhibit these disadvantages, which permits use in large-area components which have been cast, pressed or produced by other processes, such as kitchen or laboratory work surfaces, boat hulls or blades in the wind power industry.

The plastics additives (A) also lead to improvements in the production of polyolefin films without surface defects and with reduced shark skin. As a result, it is possible for the process, in film processes such as cast or blown film applications, but also downstream stretching processes such as for example BOPP applications (BOPP=biaxially oriented PP), to be run faster or even for persistent technologies based on fluoro(co)polymers to be avoided and for waste at the start (starting up the installation) and at the end (changeover to a different film formulation) to be reduced. "Shark skin" here refers to effects in which the resulting film either exhibits V-shaped flow structures (e.g. in PE) and the transparency is markedly reduced and thus the material is unsuitable for the packaging industry, or (e.g. in PP) a rather wavy, orange peel-like surface structure can be observed and as a result good quality cannot be achieved either in packaging or in decorative laminating films. Therefore, fluorine-based polymer processing aids (PPAs) are frequently used. However, these first have to coat the metal surfaces of the film units, for example the dies in the blown or cast film systems, as a result of which the start-up and shut-down product is obtained as waste. Since such additives also have a low decomposition temperature (below for example the rapid-running PP installations, in which 260° C. is common), there is what is referred to as die buildup (coating or buildup of a layer at the die or on the downstream rolls of the film units) or even corrosion of installation parts as a result of fluorine. In contrast, the plastics additives (B) have decomposition temperatures which are at least 100° C. above the PP extrusion temperature. For PE, this gap is accordingly even greater.

Further advantageous technical effects of the plastics additives (A) can be found in the examples.

DETAILED DESCRIPTION OF THE INVENTION

Figure 1:
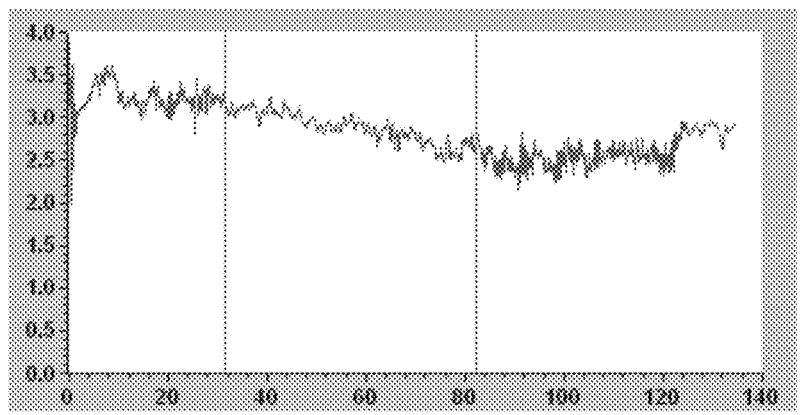
FIG. 1 shows the pulling force as a function of forward travel, determined in accordance with a method [10] as described in the examples, for a tacky TPU surface.

The present invention is described by way of example in the examples set out below, without any possibility that the invention, the scope of application of which is apparent from the entirety of the description, can be read as being confined to the embodiments stated in the examples. In particular, the synthesis of the inventive plastics additives with branches in the siloxane backbone and optionally with an additional branch in the polyester segment is described hereafter.

Preparation of the Polyester-Modified, Branched Organosiloxanes:

General Methods:

Nuclear Magnetic Resonance Spectroscopy (NMR Spectroscopy):

The organosiloxanes can be characterized with the aid of $^1$H NMR and $^{29}$Si NMR spectroscopy. These methods, especially taking account of the multiplicity of the couplings, are familiar to the person skilled in the art.

Determination of the SiH Values:

The SiH values of the SiH-functional organosiloxanes used, and also those of the reaction matrices, are determined using a gas-volumetric method by the sodium butoxide/butanol-induced decomposition of weighed aliquots of samples, using a gas burette. When the hydrogen volumes measured are inserted into the general gas equation, they allow determination of content of the SiH functions in the starting materials, and also in the reaction mixtures, and thus allow monitoring of conversion. A solution of sodium butoxide in butanol is used (5% by weight of sodium butoxide).

General Synthesis Method:

The polyester-modified organosiloxanes are prepared in three stages. In the first stage, the SiH-functional organosiloxanes are prepared. In the second stage, the SiH-functional organosiloxanes prepared are used to prepare hydroxy-functional organosiloxanes by means of hydrosilylation of unsaturated alcohols. In the third stage, the hydroxy-functional organosiloxanes obtained are reacted with lactones via a polyaddition reaction to give polyester-modified organosiloxanes:

First Stage—Preparation of the SiH-Functional Organosiloxanes (SH):

The preparation was effected as disclosed in document EP 2176319 B1.

A 250 ml four-neck flask, equipped with a precision glass stirrer, an internal thermometer, a dropping funnel and a distillation bridge, was initially charged with the respective amounts of α,ω-dihydropolydimethylsiloxane (raw material 1, SiH value=3.0 mmol/g), polymethylhydrosiloxane (raw material 2, SiH value=15.7 mmol/g), methyltriethoxysilane (MTEOS), phenyltriethoxysilane (PTEOS), decamethylcyclopentasiloxane (D5) and hexamethyldisilazane (HMDS) at room temperature with stirring (cf, table 1), 0.1 g of trifluoromethanesulfonic acid were added and the mixture was stirred for 30 minutes. A mixture of 7.8 g of deionized water and 10 ml of methanol was added dropwise while stirring within a further 30 minutes, and the mixture was subsequently stirred for a further 30 minutes. The reaction mixture was heated to 40° C. for 1 hour and then distilled in a waterjet-pump vacuum of about 50 mbar at 40° C. for 1 hour. After neutralization with 2 g of sodium hydrogencarbonate and filtration, 6 g of Lewatite® 2621, a predried cation exchange resin containing sulfonic acid groups, were added, and the mixture was stirred at 40° C. for 4 hours and filtered. This gave a clear, colourless liquid in each case. Starting weights and further details of the preparation of the SEH-functional organosiloxanes can be found in table 1.

TABLE 1

Starting weights and further details of the preparation of the SiH-functional organosiloxanes of formula (3')
$M^1_{m1} M^{2'}_{m2} D^1_{d1} D^{2'}_{d2} T_t Q_q$ formula (3')
$M^{2'} = [R^1_2 HSiO_{1/2}]$ and $D^{2'} = [R^1 HSiO_{2/2}]$;

| | SH1 | SH2 | SH3 | SH4 | SH5 | SH6 |
|---|---|---|---|---|---|---|
| Raw material 1 | 42.2 g | 67.9 g | 42.4 g | — | 43.7 g | 43.3 g |
| Raw material 2 | — | — | — | 7.5 g | 5.6 g | — |
| MTEOS | — | 25.9 g | 11.3 g | 7.0 g | 7.8 g | 7.7 g |
| PTEOS | 10.1 g | — | — | — | — | — |
| D5 | 47.7 g | 6.2 g | 46.3 g | 67.2 g | 42.9 g | 49.0 g |
| HMDS | — | — | — | 18.3 | — | — |
| m1 | 0 | 0 | 0 | 3 | 0 | 0 |
| m2 | 3 | 7 | 4 | 0 | 3 | 3 |
| d1 | 26 | 28 | 34 | 23 | 24 | 26 |
| d2 | 0 | 0 | 0 | 3 | 2 | 0 |
| d | 1 | 5 | 2 | 1 | 1 | 1 |
| t | 0 | 0 | 0 | 0 | 0 | 0 |
| $R^1$ | methyl/phenyl | methyl | methyl | methyl | methyl | methyl |

Second Stage—Preparation of the Hydroxy-Functional Organosiloxanes (OHS):

In an inertized 2 l three-neck flask with precision glass stirrer, internal thermometer and reflux condenser were mixed the respective amounts of SiH-functional organosiloxane and unsaturated alcohol selected from 2-allyloxyethanol, 1-hexenol and trimethylolpropane monoallyl ether (TMPMAE) (cf. table 2) and heated to 80° C. while stirring. 6 mg of di(μ-chloro)dichlorobis(cyclohexene)diplatinum(II) and 0.36 g N-ethyldiisopropanolamine were added and the mixture was stirred, the exothermicity being controlled by counter-cooling in order to keep the temperature at 125° C. The hydrosilylation reaction was brought to full conversion in relation to the hydrogen content of the SiH-functional organosiloxanes. In the context of the present invention, full conversion is understood to mean that more than 99% of the SiH functions were converted. Detection is effected in the manner familiar to those skilled in the art by gas-volumetric means after alkaline breakdown. After the reaction had been brought to full conversion, the crude product obtained was purified by means of distillation at 130° C. and 1 mbar for 1 h. This gave a transparent, pale beige, liquid product in each case. Starting weights and further details of the preparation of the hydroxy-functional organosiloxanes can be found in table 2.

TABLE 2

Starting weights and further details of the preparation of the hydroxy-functional organosiloxanes of formula (3″)
$M^1{}_{m1}M^{2″}{}_{m2}D^1{}_{d1}D^{2″}{}_{d2}T_tQ_q$ formula (3″)
$M^{2″} = [R^1{}_2R^{2″}SiO_{1/2}]$ and $D^{2″} = [R^1R^{2″}SiO_{2/2}]$;

| SH | OHS1 SH1 | OHS2 SH1 | OHS3 SH2 | OHS4 SH3 | OHS5 SH6 | OHS6 SH4 | OHS7 SH5 |
|---|---|---|---|---|---|---|---|
| Starting weight SH | 769.2 g | 769.2 g | 524.0 g | 675.6 g | 560.0 g | 671.0 g | 619.2 g |
| Alcohol | 2-allyloxy-ethanol | 1-hexenol | 2-allyloxy-ethanol | 2-allyloxy-ethanol | TMPMAE | 2-allyloxy-ethanol | 2-allyloxy-ethanol |
| Starting weight alcohol | 132.8 g | 151.2 g | 137.9 g | 132.8 g | 185.7 g | 119.5 g | 185.9 g |
| m1 | 0 | 0 | 0 | 0 | 0 | 3 | 0 |
| m2 | 3 | 3 | 7 | 4 | 3 | 0 | 3 |
| d1 | 26 | 26 | 28 | 34 | 26 | 23 | 24 |
| d2 | 0 | 0 | 0 | 0 | 0 | 3 | 2 |
| t | 1 | 1 | 5 | 2 | 1 | 1 | 1 |
| q | 0 | 0 | 0 | 0 | 0 | 0 | 0 |
| p | 1 | 1 | 1 | 1 | 2 | 1 | 1 |
| $R^1$ | methyl phenyl | methyl/phenyl | methyl | methyl | methyl | methyl | methyl |
| $R^{2″}$ | (a″) | (b″) | (a″) | (a″) | (c″) | (a″) | (a″) |

(a″) = —$(CH_2)_3$—O—$(CH_2)_2$—OH
(b″) = —$(CH_2)_6$—OH (c″) = 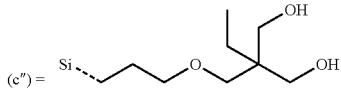

Third Stage—Preparation of the Polyester-Modified Organosiloxanes (PES):

In an inertized 500 ml three-neck flask with precision glass stirrer, dropping funnel, internal thermometer and reflux condenser, the respective amounts (cf. table 3) of hydroxy-functional organosiloxanes and lactones selected from ε-caprolactone and δ-valerolactone were heated to 135° C. while stirring, 20 g of distillate were withdrawn by carefully applying a vacuum. The apparatus was then flushed with nitrogen and thus brought to atmospheric pressure. Subsequently, the mixture was heated to 145° C. 500 ppm of tin(II) 2-ethylhexanoate were added and the reaction mixture was stirred at 150° C. for 6 hours. The viscous liquids obtained were introduced into a metal dish for cooling. After the products had fully hardened and cooled, they were broken into white flakes or ground into a white powder. Starting weights and further details of the preparation of the polyester-modified organosiloxanes can be found in table 3.

TABLE 3

Part I: Starting weights and further details of the preparation of the hydroxy-functional organosiloxanes of formula (2)

| OHS | PES1 OHS1 | PES2 OHS2 | PES3 OHS3 | PES4 OHS1 |
|---|---|---|---|---|
| Starting weight OHS | 720.2 g | 727.6 g | 369.9 g | 272.0 g |
| Lactone | ε-caprolactone | ε-caprolactone | ε-caprolactone | λ-valerolactone |
| Starting weight lactone | 1394.2 g | 1346.3 g | 406.3 g | 224.3 g |
| m1 | 0 | 0 | 0 | 0 |
| m2 | 3 | 3 | 7 | 3 |
| d1 | 26 | 26 | 28 | 26 |
| d2 | 0 | 0 | 0 | 0 |
| t | 1 | 1 | 5 | 1 |
| q | 0 | 0 | 0 | 0 |
| p | 1 | 1 | 1 | 1 |
| $R^1$ | methyl/phenyl | methyl/phenyl | methyl | methyl/phenyl |
| $R^3$ | (a) | (b) | (a) | (a) |
| $R^4$ | 14× capryl | 14× capryl | 5.7× capryl | 3.7× capryl + 3.7× valeryl |

TABLE 3-continued

Part II: Starting weights and further details of the preparation of the hydroxy-functional organosiloxanes of formula (2)

| OHS | PES5<br>OHS4 | PES6<br>OHS5 | PES7<br>OHS6 | PES8<br>OHS7 |
|---|---|---|---|---|
| Starting weight OHS | 437.1 g | 400.7 g | 376.8 g | 410.0 g |
| Lactone | ε-caprolactone | ε-caprolactone | ε-carpolactone | ε-caprolactone |
| Starting weight lactone | 684.8 g | 719.1 g | 719.1 g | 694.0 g |
| m1 | 0 | 0 | 3 | 0 |
| m2 | 4 | 3 | 0 | 3 |
| d1 | 34 | 26 | 23 | 24 |
| d2 | 0 | 0 | 3 | 2 |
| t | 2 | 1 | 1 | 1 |
| q | 0 | 0 | 0 | 0 |
| p | 1 | 2 | 1 | 1 |
| $R^1$ | methyl | methyl | methyl | methyl |
| $R^3$ | (a) | (c) | (a) | (a) |
| $R^4$ | 10× capryl | 7× capryl | 14× capryl | 8× capryl |

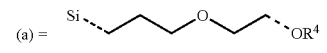

Polyester-Modified, Linear Organosiloxane:

As a comparative example not in accordance with the invention, the commercially available product TEGOMER® H-Si 6440P (from Evonik) was used in the performance tests. This is a linear organosiloxane polyester-modified in the α,ω position. It is also referred to hereafter as PES0.

Performance Tests:

Compound Production—General Description:

Premixes of 2.5 kg each, consisting of the corresponding plastic (PMMA, PE, PP, PA, TPU) and the selected plastics additives, were made up. This involved adding the inventive and non-inventive plastics additives in the respectively reported proportions by mass, based on the total composition of the premix (reported in % or % by weight).

The resulting premix was subsequently introduced into a Brabender metering unit and fed via a conveying screw to the Leistritz ZSE27MX-44D twin-screw extruder (manufacturer Leistritz Extrusionstechnik GmbH) for the processing. The processing to give the respective compound was effected at a defined speed (rpm) and a defined temperature setting. The plastics extrudate was subsequently pelletized, with a waterbath generally being used to cool the extrudate, with the exception of the TPU where underwater pelletization was used. The temperature profiles of the respective plastics were selected in accordance with the technical data sheets. The temperatures, speeds and pressures of the various plastics can be found in table 4:

TABLE 4

Process parameters for the production of the compounds

| | Plastic | Extrusion temperature [° C.] | Speed [rpm] | Pressure [bar] |
|---|---|---|---|---|
| PMMA | Plexiglas ® 8N (Evonik) | 245 | 200 | 36 |
| PE | LLDPE LL 1004YB (ExxonMobil) | 185 | 200 | 60 |
| PP | Sabic ® PP 505P (Sabic) | 205 | 200 | 40 |
| PA | Durethan ® B30S (Lanxess) | 265 | 140 | 33 |
| TPU | Desmopan ® 385 S (Covestro) | 142 | 150 | 70 |

For the PA compounds having flame resistance, in addition to the plastic-additive premix a further component in the form of the flame retardant was added to the formulation. For this purpose, the flame retardant Exolit® 1312 from Clariant was added in zone 5 of the abovementioned extruder in a proportion by mass of 25% based on the total composition. The proportion by mass of the plastic-additive premix was 75% based on the total composition.

In the PP compounds a blue masterbatch was used in some tests and in the PMMA compounds a PMMA black masterbatch was needed for some tests, which are then mentioned with their % by weight in the specific comments on the results.

Production of the Test Specimens, Mouldings and Films and the Testing Thereof:

The application methods applied which were used to produce the inventive and non-inventive mouldings based on the compounds produced are specified hereafter. An overview of the methods is shown in table 5.

TABLE 5

Overview of application methods

Figure 2:
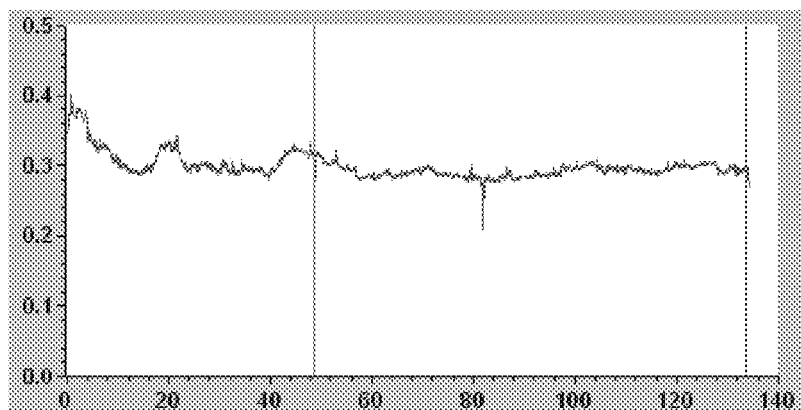
FIG. 2 shows the pulling force as a function of forward travel, determined in accordance with a method [10] as described in the examples, for a partially tacky TPU surface.
Figure 3:
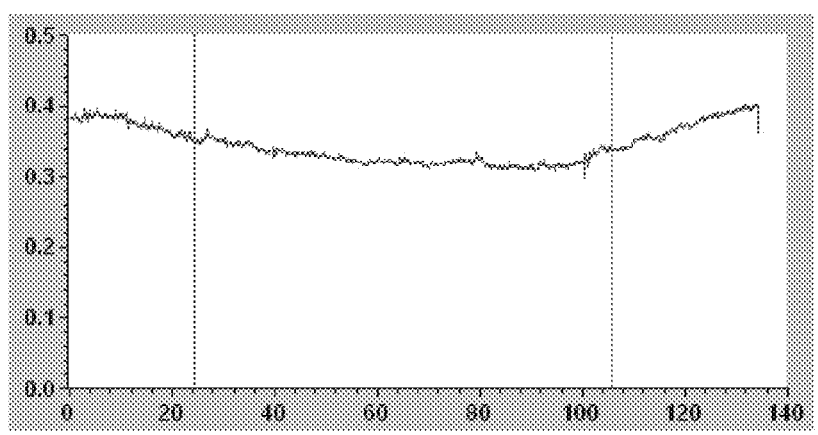
FIG. 3 shows the pulling force as a function of forward travel, determined in accordance with a method [10] as described in the examples, for a non-tacky TPU surface.

| No. | Methods | Plastic | Unit |
|---|---|---|---|
| 1 | Colour strength (L*a*b* values) DIN 55986 | PP | |
| 2 | Opacity (1 mm, 2 mm) | PMMA TPU PE PP | % |
| 3 | Gloss (20°) DIN 5036 | PE | |
| 4 | Melt flow index (MFI) DIN 53735 | PE PP | g/10 min |
| 5 | Flow spirals | PA | cm |
| 6 | Shark skin/assessment of the surface quality | PE PP | 1 = very smooth = no shark skin<br>2 = smooth = hardly any shark skin<br>3 = slightly wavy, transparency slightly reduced = little shark skin<br>4 = wavy, transparency reduced = intense shark skin |
| 7 | Tensile fest Modulus of elasticity ($E_t$) DIN EN 527-2 Type 1A | PA | MPa |
| 8 | Multi-finger scratch (5 finger test) | PMMA: 2N, 3N, 5N, 7N, 10N | visible slightly visible not visible |
| 9 | Crockmaster 9N | PMMA: 100, 250, 500 strokes<br>TPU: 25, 50, 100 strokes | visible slightly visible not visible |
| 10 | Coefficient of friction μ (COF) | TPU:2N against metal | FIG. 1 = poor<br>FIG. 2 = average<br>FIG. 3 = very good |
| 11 | UL94 | PA | V-0<br>V-1<br>V-2<br>failed |
| 12 | Tracking resistance (CTI) | PA | Volt |

Methods [1], [2]& [3]: Production and Testing of the Optical Properties of Mouldings (Colour Strength, Opacity, Gloss, Transparency) on the Basis of Injection Moulded Sheets or Films The compounds produced were processed on an injection moulding machine (type: ES 200/50HL, from Engel Schwertberg—Austria) into smooth sheets (injection mould: double sheets smooth, from AXXICON) having a size of 6 cm×6 cm and a thickness of 2 mm. Injection moulding conditions were chosen in accordance with the technical data sheets for the plastics used. Film samples which had been produced on a blown film or cast film installation could also be assessed as described below. To this end, an 8 cm×8 cm piece was cut out of the film and used as a sample. The film was previously tested with respect to its layer thickness in order to rule out possible variations in the properties being due to variations in the layer thickness. In this case, the layer thickness must not deviate by more than 10% from the desired layer thickness and the layer thickness of the comparative sample. A Brabender Lab Station type 815801 from Brabender GmbH & Co KG was used to produce the films and the material was fed to the die using the associated mini extruder from Brabender, type: 625249,120. Either a 15 cm wide slot die for cast films was fitted or a blown film head having a diameter of 10 cm on which blown films were manufactured. The cast films were then wound up on a Brabender Univex Take off apparatus type: 843322 and the blown films on a Brabender apparatus type: 840806. The conditions for film production were taken from the technical data sheets for the plastics processed and all films were produced at a speed of 18 m/min The sheets/films were examined with respect to the opacity thereof using an SP62 apparatus from X-Rite and the transparency was assessed.

In the case of transparent samples such as for example for PMMA, the L*a*b* values of the transparent sheets were collected against a black background, because in this way reduced transparency becomes apparent in higher L* values and the opacity in the case of reduced transparency has higher values. In the case of coloured sheets, the L*a*b* values were ascertained using an SP62 colour strength measuring instrument from X-Rite and the resulting colour strengths were each calculated with respect to a composition without plastics additive, that is to say that these were calculated starting from 100%. A model SP62 spectrophotometer manufactured in September 2007 from X-Rite was used for the measurements. These coloured sheets of PMMA were measured against a white background (standard plate of the apparatus).

For determining the gloss of the various materials, the sheets (6 cm×6 cm×2 mm) described previously in the production or the corresponding film samples (8 cm×8 cm) having controlled layer thickness were likewise used. This involved taking in each case 3 measurements at different angles (20°, 60° and 85°), with the 20° angle being used for the assessment. The three measured values at the 20° angle were used for averaging. The films were fixed with double-sided adhesive tape. A Micro-TRI-Gloss model apparatus of category 4430 1.5 DC/0.1A from Byk-Gardner GmbH was used for gloss determination.

Method [4]: Testing the Melt Flow Index (MFI)

The compounds produced were examined in accordance with DIN 53735 with respect to the melt flow behaviour thereof (apparatus used: Meltflixer$^{LT}$, type: MFI-LT, from SWO Polymertechnik GmbH). The MFI (melt flow index) is reported here in grams of plastic/10 min for plastics and compounds:

MFI=(mass [g]/time [s])×600 [s]

Unless otherwise indicated, all tests in the respective test series were carried out under identical test conditions. This was conducive to the purpose of comparability of the results. The conditions for the weight applied (mass in the above-mentioned formula) were selected here in each case as indicated on the technical data sheets for the plastics used in the compounds.

Method [5]: Flow Spirals

The flowability of the flame-retardant polyamide compounds was ascertained by means of producing flow spirals (injection mould: flow spirals, from AXXICON). These were produced on an injection moulding machine (type: ES 200/50HL, from Engel Schwerlberg—Austria) and compared against compounds which did not contain any additive. The injection moulding conditions were chosen in accordance with the specifications in the technical data sheet for the polyamide used. Where longer flow spirals are observed, this signifies better flowability.

Method [6]: Assessment of the Surface Quality/Shark Skin

The PE and PP film samples for assessment of the surface quality were produced as described under methods [1], [2], [3] with the modular Brabender set-up. 8 cm×8 cm pieces were cut from the resulting films, visually assessed and graded as follows:
1=very smooth=no shark skin
2=smooth=hardly any shark skin
3=slightly wavy, transparency slightly reduced=little shark skin
4=wavy, transparency reduced=intense shark skin For PE films there is more typically formation of V-shaped flow structures, which is referred to as shark skin, whereas for PP films a surface waviness is more likely to be observed. Both effects were brought together here in the assessment of the films. In addition, the time after which the best film image forms with the additive used was determined. The shorter the time, the less waste is generated in a film installation. A shorter time is therefore advantageous. PE and PP are frequently not processable without addition of a PPA (polymer processing aid).

Method [7]: Production and Testing of the Mechanical Properties of Mouldings

For the testing of the mechanical properties of the compounds, dumbbell specimens (in accordance with DIN EN ISO 527-2 type 1A) were injection moulded using an injection moulding machine (type: ES 200/50HL, from Engel Schwertberg—Austria) in accordance with the injection moulding conditions provided in the technical data sheets for the plastics (injection mould: dumbbell specimens, from AXXICON), The test pieces were tested with regard to the mechanical properties thereof using a tensile testing machine (Zwick Roell Z010 type, BDO-FBO10TN type with macro fixture type B066550) and the following parameters were determined: tensile modulus/modulus of elasticity ($E_t$) (according to DIN EN ISO 527-2 type 1A).

Methods [8]& [9]: Production and Testing of the Wipe Resistance (Abrasion Resistance) and Scratch Resistance of Mouldings (5 Finger Test & Crockmaster 9N)

The compounds produced were processed on an injection moulding machine (type: ES 200/50HL, from Engel Schwertberg—Austria) to give smooth sheets having a size of 6 cm×6 cm and a thickness of 2 mm (analogously to the mouldings for the assessment of the optical properties). The black and transparent sheets served for assessing scratches and abrasion caused by the testing.

To evaluate the abrasion resistance (wipe resistance), the sheets were assessed using a Crockmaster 9N (CM-5 AATCC CROCKMETER, from SDL Atlas; model M238BB) in each case after 100, 250 and 500 strokes for PMMA and in each case after 25, 50 and 100 strokes for TPU.

The scratch resistance was ascertained using a multi-finger test/5 finger test (model: 710, manufacturer: Taber Industrie), The scratches were made by a tip (diameter 1 mm) upon which various applied weights, rising from 2 N, 3 N, 5 N, 7 N and 10 N were placed. The five tips moved over the sheets to be examined at 7.5 metres per minute. The scratches were then assessed.

Method [10]: Determination of the Coefficients of Friction (COF)

A TPU sheet (6 cm×6 cm with 2 mm thickness) was moved with an applied weight of 200 g (corresponding approximately to an applied force $F_p$ of 2 N) over a metal sheet at a speed of 100 min/min. The resulting force $F_D$ was detected over the distance advanced of 15 cm and recorded in the form of a graph. The coefficient of friction is the quotient of the resulting force (pulling force) and applied force (COF=$F_D/F_P$). The measuring instrument used was an FT-1000-H type apparatus from Ziegler, manufactured in November 2016. When assessing the plastics composition, however, it did not come down to just the reduction in the COF, but also to the form of the graphs, as is explained below, to be able to incorporate the plastics composition as seals in moving parts such as for example pumps. The graph measured was to this end compared with the curve types in FIGS. 1, 2 and 3 and categorized:
FIG. 1=poor
FIG. 2=average
FIG. 3=very good The graph shown in FIG. 1 is typical for a tacky surface and a low coefficient of friction, as was observed in the case of a TPU without additive.

The graph shown in FIG. 2 is typical for a partially tacky surface and a nonuniform reduction of the coefficient of friction, particularly at the start of the measurement. The greater variation in the amplitude (y axis) is indicative of inhomogeneous additive distribution. The friction characteristics are frequently not reproducible.

The graph shown in FIG. 3 is typical for a non-tacky surface. There is a homogeneous additive distribution. The variation in the amplitude (y axis) is less than 0.1 over the entire forward travel of the measurement. The measurement is reproducible.

Method [11]: Production and Testing of Flame-Retardant Polyarnide Mouldings (UL94)

After drying the PA compounds to a residual moisture content of <0.1% by weight, these were processed on an injection moulding machine (type: ES 200/50HL, from Engel Schwertberg—Austria) to give test specimens (injection mould: tensile test bar, 1.5 mm thick & 3.00 mm thick, from AXXICON). The test specimens were tested and classified with respect to flame retardancy using the UL 94 test (Underwriter Laboratories). In order to ascertain the flame resistance according to the fire classifications below, in each case 5 test specimens per compound produced were subjected to the UL 94 test.

UL 94 Fire Classifications:

V-0: No afterflame longer than 10 seconds is permitted. The sum total of afterflame time for 10 flame applications must not be greater than 50 seconds. The sample must not drip while burning. The sample must not burn away completely. No afterglow of the sample for longer than 30 seconds after the end of flame application is permitted.

V-1: No afterflame longer than 30 seconds is permitted. The sum total of afterflame time for 10 flame applications must not be greater than 250 seconds. No afterglow of the sample for longer than 60 seconds after the end of flame application is permitted. The other criteria are as for V0.

V-2: Ignition of the cotton batting by burning droplets. The remaining criteria are as per V-1.

f: failed. Does not even meet fire classification V-2.

The test bars were burnt in a UL 94 test chamber from Mess- and Prüfsysteme GmbH.

Method [12]: CTI—Determination of the Tracking Resistance of Flame-Retardant Polyamide Mouldings The CTI value (Comparative Tracking Index) of the PA test specimens produced in accordance with method [7] was determined in order to draw conclusions regarding the tracking resistance. The tests were performed by a duplicate determination at both head ends of the dumbbell specimen. The CTI value indicates the voltage (in volts) up to which the test specimen exhibits no tracking when a droplet (at most 50 droplets) of standardized electrolyte solutions was dropped between two platinum electrodes every 30 seconds. Here, tracking means that the test piece becomes conductive under voltage and ignites as a result. A notch is burnt into the compound and is subsequently measured. The best classification for compounds of this type is 600 V and <1 mm burn-in depth, which should be achieved in E+E applications. An M 31.06 type apparatus from PTL Dr. Grabenhorst GmbH was used for the determination of the CTI.

Performance Results of the Plastics Compositions Examined (Compounds, Sheets, Films):

Results for Polyolefin Composition Based on Polyethylene (PE) and Polypropylene (PP):

Results for Polyethylene Compositions (PE):

The branched polyester siloxanes PES1 to PES8 were used in comparison to the linear polyester siloxane PES0 in each case at 2% by weight based on the total composition and compared with a PE without additive (blank sample) with respect to the opacity and the gloss at 20° of 2 mm sheets. The resulting compounds are referred to hereafter as PE0-A to PE8-A. Compounds were produced analogously each having a content of 3.5% by weight of polyester siloxanes. The resulting compounds are referred to hereafter as PE0-B to PE8-B. Films having a thickness of 100 μm were produced from these compounds and from a PE without additive (blank sample). In addition to the opacity of the films thus obtained, the melt flow index (MFI) of the compounds was determined. The results are summarized in Table 6.

TABLE 6

Results for polyethylene compositions

| Additive | Compound | Opacity 2 mm sheet | Opacity 0.1 mm film | Gloss 20° | MFI [g/10 min] |
|---|---|---|---|---|---|
|  | PE without additive | 50.29% | 13.82% | 62.8 | 2.4 |
| PES0 | PE0-A | 60.18% |  | 61.9 |  |
|  | PE0-B |  | 15.09% |  | 2.9 |
| PES1 | PE1-A | 53.21% |  | 67.2 |  |
|  | PE1-B |  | 13.99% |  | 4.8 |
| PES2 | PE2-A | 56.28% |  | 68.4 |  |
|  | PE2-B |  | 14.07% |  |  |
| PES3 | PE3-A | 56.17% |  | 68.9 |  |
|  | PE3-B |  | 13.84% |  | 4.6 |
| PES4 | PE4-A | 52.11% |  | 74.9 |  |
|  | PE4-B |  | 13.67% |  |  |
| PES5 | PE5-A | 55.63% |  | 69.1 |  |
|  | PE5-B |  | 14.04% |  |  |
| PES6 | PE6-A | 54.78% |  | 73.5 |  |
|  | PE6-B |  | 13.96% |  | 4.2 |
| PES7 | PE7-A | 54.91% |  | 71.0 |  |
|  | PE7-B |  | 13.92% |  |  |
| PES8 | PE8-A | 55.29% |  | 75.2 |  |
|  | PE8-B |  | 13.94% |  | 4.5 |

In 2 mm sheets using 2% by weight, the inventive branched polyester siloxanes PES1 to PES8 had a markedly better opacity compared to the linear polyester siloxane PES0 without branching. This was still clear in 0.1 mm thick films even with relatively high additization at 3.5% by weight. An increase in gloss could generally be observed in all examples of the invention. A particularly high gloss could be observed for PES1, PES6 and PES8. Specifically for articles which are produced by injection moulding processes or in what is referred to as the blow moulding process, such as for example cosmetics bottles and the like, this leads to a higher quality appearance. The plastics additives according to the invention enable an increase in the MFI, which can be an advantage in injection moulding and also in the production of films where, as a result of new packaging regulations regarding 5-13 film layers in the structure there is the need to adjust the flowability of polyolefins used such that monopolymer structures are possible, that is to say all layers have to be made from just one polyolefin (e.g. PE). Different functional layers must therefore be adaptable in terms of their MFI.

Results for Polypropylene Compositions—Compounds and Sheets:

The branched polyester siloxanes PES1 to PES8 were used in comparison to the linear polyester siloxane PES0 in each case at 2% by weight based on the total composition and compared with a PP without additive (blank sample) with respect to the opacity of 2 mm sheets. The resulting compounds are referred to hereafter as PP0-A to PP8-A. In a further experiment, the PP0-A to PP8-A materials were coloured in order to determine the achievable colour strength. To this end, 1.5% by weight, based on the total composition, of a PP masterbatch was used in order to colour the materials blue. The PP masterbatch was composed of 60% by weight of PP having an MFI of 45 g/10 min, 30% by weight of pigment blue phthalocyanine and 10% by weight of TEGOMER® P 121 (% by weight based on the composition of the PP masterbatch). As blank sample, a corresponding PP compound without additive was used for the calculation of the colour strength based on L*a*b* values. The colour strength of the blank sample was set to 100%. In addition, compounds having a content of 6% by weight of polyester siloxanes were produced. The resulting compounds are referred to hereafter as PP0-B to PP8-B. The MR of these materials was ascertained. The results are summarized in Table 7.

TABLE 7

Results for polypropylene compositions - compounds and sheets

| | | PP | | |
|---|---|---|---|---|
| Additive | Compound | Opacity 2 mm sheet | MFI [g/10 min] | Colour strength of the sheets coloured blue |
| | PP without additive | 20.33% | 4.88 | 100.0% |
| PES0 | PP0-A | 35.92% | | 69.2% |
| | PP0-B | | 5.67 | |
| PES1 | PP1-A | 29.18 | | 83.7% |
| | PP1-B | | 8.39 | |
| PES2 | PP2-A | | | |
| | PP2-B | | | |
| PES3 | PP3-A | 26.81% | | 89.2% |
| | PP3-B | | 7.76 | |
| PES4 | PP4-A | | | |
| | PP4-B | | | |
| PES5 | PP5-A | | | |
| | PP5-B | | | |
| PES6 | PP6-A | 24.52% | | 9'1.1% |
| | PP6-B | | 8.60 | |
| PES7 | PP7-A | | | |
| | PP7-B | | | |
| PES8 | PP8-A | 27.44% | | 85.3% |
| | PP8-B | | | |

The inventive examples, based on the branched polyester siloxanes PES1 to PES8, exhibited markedly reduced opacity values and hence a higher transparency compared to the non-inventive example based on the linear polyester siloxane PES0. The same could be observed for the materials coloured blue, where the blue pigment expressed its colour strength from the PP masterbatch much more intensely. Less masterbatch can thus be used for colouring plastics composition. Moreover, the colour tone was also brighter overall. This makes it possible to also produce optically more demanding parts in the injection moulding process. The increase of the MFI by the inventive additives is a further advantage which turned out to be much more potent in the case of the branched polyester siloxanes PES1-PES8 than for the unbranched, linear polyester siloxane PES0.

Results for Polypropylene Compositions—Films:

In a further step, compounds based on PP with an additive content of 10% by weight were produced. Such more highly concentrated compounds are also referred to in the industry as additive masterbatch. 1% by weight of this compound was then used on a blown film installation and mixed with 99% by weight of PP without additive in the Brabender unit, so that the resulting concentration of the additive in the 80 µm film produced was 0.1% by weight. The corresponding compositions are referred to hereafter as PP0-C to PP8-C. The films were then assessed with respect to shark skin formation as a function of time. Shark skin formation was evaluated here with the grades 1 to 4 as explained above. The film quality was assessed at 30-second intervals using film samples that had been taken as described above. The shorter the time and the lower the grade, the better the plastics additive used. Films based on the compositions PP0-D to PP8-D were produced analogously. These compositions were mixed from only 0.5% by weight of the 10% compounds and 99.5% by weight of PP on a blown film unit, so that the resulting concentration of the additive in the 80 µm film produced was 0.05% by weight. The results are summarized in Table 8.

TABLE 8

Results for polypropylene compositions - films

| | | PP (Shark skin assessment) | | | |
|---|---|---|---|---|---|
| Additive | Compound | 30 s | 60 s | 90 s | 120 s |
| | PP without additive | 4 | 4 | 4 | 4 |
| PES0 | PP0-C | 3 | 3 | 3 | 2 |
| | PP0-D | 4 | 4 | 3 | 3 |
| PES1 | PP1-C | 3 | 2 | 1 | 1 |
| | PP1-D | 3 | 2 | 2 | 1 |
| PES2 | PP2-C | 2 | 2 | 1 | 1 |
| | PP2-D | 3 | 2 | 1 | 1 |
| PES3 | PP3-C | 2 | 2 | 1 | 1 |
| | PP3-D | 2 | 2 | 2 | 1 |
| PES4 | PP4-C | 3 | 2 | 1 | 1 |
| | PP4-D | 3 | 2 | 2 | 1 |
| PES5 | PP5-C | 2 | 2 | 2 | 1 |
| | PP5-D | 3 | 2 | 2 | 1 |
| PES6 | PP6-C | 2 | 2 | 1 | 1 |
| | PP6-D | 2 | 2 | 1 | 1 |
| PES7 | PP7-C | 2 | 2 | 1 | 1 |
| | PP7-D | 2 | 2 | 1 | 1 |
| PES8 | PP8-C | 3 | 2 | 1 | 1 |
| | PP8-D | 3 | 2 | 2 | 1 |

In contrast, the use of a typical additive masterbatch based on fluoropolymer (Ampacet Proflow 2) at a concentration of 1% by weight still did not result in a grade 1 even after 120 s, instead it was necessary to saturate the metal surfaces of the machine parts (dies or other parts) with 2.5% by weight of the masterbatch over 3 to 4 min in order thereafter to obtain a surface quality having the grade 1 to 2 using 1% to 0.5% by weight of masterbatch. On the other hand, by using the inventive polyester siloxanes PES1 to PES8 improvements in the surface quality or a reduction in shark skin could be observed after just 30 seconds, as are not reproducible for fluoro(co)polymer-based PPAs (Polymer Processing Aid). It is thus possible with the inventive polyester siloxanes to work already even with additions of 0.5-1.0% by weight. No prior coating of the metal surfaces of the machine parts is necessary. Moreover, with the inventive polyester siloxanes PES1 to PES8, films having a surface quality of grade 2 or better could be obtained even after a short time (60 s), Here, too, the branched polyester siloxanes clearly differed from the unbranched, linear polyester siloxane PES0 with which hardly any improvement in the surface quality was apparent or was so only at a much later point in time. For this reason, in film installations having for example a 2 to 5 m diameter, the branched polyester siloxanes PES 1 to PES 8 can bring about a significant reduction in waste and reduce the formation of a coating (die buildup) without corrosion of installation parts. This can reduce downtimes of film installations.

Results for Polymethyl Methacrylate Compositions:

The non-inventive polyester siloxane PES0 and some of the inventive polyester siloxanes PES1 to PES8 were processed into transparent PMMA (PLEXIGLAS® 8N). The concentration of the polyester siloxanes here was 2% by weight for the compounds PMMA0-A to PMMA8-A and 3% by weight for the compounds PMMA0-B to PMMA8-B, based on the total composition. The blank sample used was PLEXIGLAS® SN without further addition of additives. The opacity of sheets with a thickness of 2 mm and also the Vicat softening temperature were determined. In contrast, for the determination of the scratch resistance (5 finger test) and the wipe resistance (Crockmaster), black-coloured PMMA was used. For the black colouring, 2% by weight of the black masterbatch Fibaplast Schwarz PMMA Batch 30504410 was therefore added to the compounds PMMA0-A to PMMA8-A during the production. The results are summarized in Table 9.

TABLE 9

Part I: Results for polymethyl methacrylate compositions

| Additive | Compound | Opacity (transparent PMMA) | Colour strength (black PMMA) | Softening temperature [° C.] |
|---|---|---|---|---|
|  | PMMA without additive | 16.08% | 100% | 107.5 |
| PES0 | PMMA0-A | 22.61% |  | 103.5 |
|  | PMMA0-B | 25.03% |  | 103.0 |
| PES1 | PMMA1-A | 16.41% | 94% | 107.0 |
|  | PMMA1-B | 16.88% |  | 106.5 |
| PES2 | PMMA2-A | 16.52% |  | 107.0 |
|  | PMMA2-B | 17.22% |  | 107.0 |
| PES3 | PMMA3-A | 16.83% | 93% | 107.5 |
|  | PMMA3-B | 17.37% |  | 107.5 |
| PES4 | PMMA4-A | 16.24% |  | 107.0 |
|  | PMMA4-B | 16.79% |  | 106.5 |
| PES5 | PMMA5-A | 17.20% | 97% | 107.0 |
|  | PMMA5-B | 17.63% |  | 106.5 |
| PES6 | PMMA6-A | 18.06% | 94% | 106.5 |
|  | PMMA6-B | 18.71% |  | 106.5 |
| PES7 | PMMA7-A | 16.72% | 91% | 106.5 |
|  | PMMA7-B | 17.37% |  | 107.0 |
| PES8 | PMMA8-A | 16.43% | 95% | 107.0 |
|  | PMMA8-B | 16.88% |  | 106.5 |

Part II: Results for polymethyl methacrylate compositions

| Additive | Compound | 5 finger test (black PMMA) | | | | | Crockmaster (black PMMA) | | |
|---|---|---|---|---|---|---|---|---|---|
|  |  | 2N | 3N | 5N | 7N | 10N | 100 strokes | 250 strokes | 500 strokes |
|  | PMMA without additive | visible | visible | visible | visible | visible | visible | visible | visible |
| PES0 | PMMA0-A | not visible | not visible | not visible | slightly visible | slightly visible | not visible | slightly visible | visible |
|  | PMMA0-B |  |  |  |  |  |  |  |  |
| PES1 | PMMA1-A | not visible | not visible | not visible | not visible | slightly visible | not visible | slightly visible | slightly visible |
|  | PMMA1-B |  |  |  |  |  |  |  |  |
| PES2 | PMMA2-A | not visible | not visible | not visible | not visible | not visible | not visible | not visible | slightly visible |
|  | PMMA2-B |  |  |  |  |  |  |  |  |
| PES3 | PMMA3-A | not visible | not visible | not visible | not visible | not visible | not visible | slightly visible | slightly visible |
|  | PMMA3-B |  |  |  |  |  |  |  |  |
| PES4 | PMMA4-A | not visible | not visible | not visible | not visible | slightly visible |  |  |  |
|  | PMMA4-B |  |  |  |  |  |  |  |  |
| PES5 | PMMA5-A |  |  |  |  |  | not visible | slightly visible | slightly visible |
|  | PMMA5-B |  |  |  |  |  |  |  |  |
| PES6 | PMMA6-A | not visible | not visible | not visible | not visible | not visible |  |  |  |
|  | PMMA6-B |  |  |  |  |  |  |  |  |
| PES7 | PMMA7-A | not visible | not visible | not visible | not visible | not visible | not visible | not visible | slightly visible |
|  | PMMA7-B |  |  |  |  |  |  |  |  |
| PES8 | PMMA8-A | not visible | not visible | not visible | not visible | not visible |  |  |  |
|  | PMMA8-B |  |  |  |  |  |  |  |  |

The results show that the inventive polyester siloxanes led to no, or a very minor, reduction of the transparency; the opacity values were therefore hardly above the blank sample. In contrast to this, in the case of the non-Inventive polyester siloxane, merely a clouded, only translucent PMMA compound was obtained. A further advantage of the inventive examples is the maintenance of the Vicat softening temperature in comparison to the prior art. It is as a result possible, when producing the compounds, to avoid starting with PMMAs having a higher Vicat softening temperature which are generally produced on the basis of higher molecular weights of the polymethyl methacrylates used or a specific monomer selection, but as a result also frequently have poorer flowability at the same injection temperature or have other disadvantages such as increased brittleness. Such disadvantages in the properties and the application can be avoided by the inventive polyester siloxanes. It should also be mentioned that the inventive polyester siloxanes also improved the wipe resistance and scratch resistance in black-coloured PMMA compounds. This occurred at least to the level of the commercially available, non-inventive polyester siloxane PES0, where for the scratch resistance an improvement over PES0 could even be observed, especially at the higher forces of 7N and 10N. Interestingly, the black-coloured PMMA compounds also had an improved wipe resistance, such that even at 500 strokes only slight damage, if any, could be observed. As a result, higher demands can be satisfied in the household, electronics or automobile sectors. PES1, PES4 and PES8 represent particularly advantageous species of the invention here which particularly advantageously permit a combination of various desired properties.

Results for Polyamide Compositions:

The inventive polyester siloxanes PES1 to PES8 and the non-inventive polyester siloxane PES0 were processed together with polyamide 6 to give compounds. The concentration of the polyester siloxanes was in this case 2% by weight for the compounds PA0-A to PA8-A and 3% by weight for the compounds PA1-B to PA8-B. Standard test bars for the flame retardancy test having a thickness of 1.5 mm and 3.0 mm were produced and 5 bars were tested in each case. It was noted which of the UL 94 classifications V-0, V-1 and V-2 was achieved and how frequently it was achieved. The aim is to achieve at least 4×V-0 and 1×V-1 in order to be able to safely rate the compound with UL 94 V-0, 5×V-0 is particularly advantageous. In addition, a CTI test of the compounds PA0-A to PA8-A was performed and the length of the flow spirals of these compounds was ascertained. The modulus of elasticity of the compounds PA0-A to PA8-A was likewise determined. The results are summarized in Table 10.

TABLE 10

Results for polyamide compositions

| Additive | Compound | UL94 1.5 mm | UL94 3.0 mm | Modulus of elasticity [MPa] | CTI [V] | Flow spirals [cm] |
|---|---|---|---|---|---|---|
| | PA without additive | 1x V-0 4x V-1 | 3x V-0 2x V-1 | 3470 | 500 | 16.0 |
| PES0 | PA0-A | 1x V-0 4x V-1 | 3x V-0 2x V-1 | 3210 | 500 | 16.4 |
| PES1 | PA1-A | 3x V-0 2x V-1 | 5x V-0 | 3630 | 525 | |

TABLE 10-continued

Results for polyamide compositions

| Additive | Compound | UL94 1.5 mm | UL94 3.0 mm | Modulus of elasticity [MPa] | CTI [V] | Flow spirals [cm] |
|---|---|---|---|---|---|---|
| | PA1-B | 5x V-0 | | | 550 | |
| PES2 | PA2-A | 5x V-0 | 5x V-0 | 3620 | 550 | |
| | PA2-B | | | | | |
| PES3 | PA3-A | 3x V-0 2x V-1 | 5x V-0 | 3640 | 525 | 18.3 |
| | PA3-B | 5x V-0 | | | 550 | |
| PES4 | PA4-A | 3x V-0 2x V-1 | 5x V-0 | 3720 | 550 | |
| | PA4-B | | | | | |
| PES5 | PA5-A | 5x V-0 | | 3640 | 575 | |
| | PA5-B | | | | | |
| PES6 | PA6-A | 4x V-0 1x V-1 | | 3570 | 550 | 18.0 |
| | PA6-B | 5x V-0 | | | 575 | |
| PES7 | PA7-A | 5x V-0 | | 3680 | 525 | |
| | PA7-B | | | | | |
| PES8 | PA8-A | 3x V-0 2x V-1 | | 3660 | 575 | 17.9 |
| | PA8-B | 5x V-0 | | | 575 | |

The results show clear advantages for the branched polyester siloxanes PES1 to PES8. For instance, an improvement in the flame resistance could already be observed with 1,5 mm thick materials. In contrast, an improvement in the flame resistance in the case of the linear polyester siloxane PES0 could not be achieved even with 3.0 mm thick materials. The use of the linear polyester siloxane PES0 had the additional disadvantage that the modulus of elasticity of the compound and hence the mechanical strength were reduced. In contrast to this, in the case of the branched polyester siloxanes an increase in the modulus of elasticity, that is to say an improvement in the mechanical strength, could be observed. The improvement in the flame retardant properties in the case of polysiloxanes PES1 to PES8 is also evident from the increased CTI value. Besides the improved UL-94 performance in the case of polysiloxanes PES1 to PES8, these also exhibit improved electrical properties. Combined with mechanical properties (modulus of elasticity) which are at least equally as good as those exhibited by the blank sample (PA without additive), this is very advantageous. As a result of the good flowability (the melt flow index is increased by at least 10%), thin-walled electrical components can therefore also be realized.

Results for Thermoplastic Polyurethane Compositions:

The branched polyester siloxanes PES1 to PES8 and the linear polyester siloxane PES0 were processed together with TPU to give compounds. The concentration of the polyester siloxanes was in this case 1% by weight for the compounds TPU0-A to TPU8-A and 2% by weight for the compounds TPU0-B to TPU8-8. The opacity of sheets having a thickness of 2 mm and of foils having a thickness of 0.5 mm was determined. The linear polyester siloxane PES0 at a concentration of 2% by weight led to such intense cloudiness that a measurement of the opacity was no longer meaningful. In addition, the friction characteristics (COF) were examined and the abrasion resistance was determined by means of Crockmaster. The results are summarized in Table 11.

TABLE 11

Results for thermoplastic polyurethane compositions

| | | \multicolumn{6}{c}{TPU} | | |
|---|---|---|---|---|---|---|---|---|
| | | Opacity | Opacity | Crockmaster | | | COF 2N | Graph |
| Additive | Compound | 2 mm sheets | 0.5 mm film | 25 strokes | 50 strokes | 100 strokes | against metal | type 1, 2 or 3 |
| | TPU without additive | 17.55% | 16.28% | slightly visible | slightly visible | visible | 1.45 | 1 |
| PES0 | TPU0-B | 46.21% | 39.08% | slightly visible | slightly visible | visible | 1.39 | 1 |
| PES1 | TPU1-A | | | | | | | |
| | TPU1-B | | | | | | | |
| PES2 | TPU2-A | | | | | | 0.81 | 3 |
| | TPU2-B | | | | | | 0.55 | 3 |
| PES3 | TPU3-A | | | | | | | |
| | TPU3-B | | | | | | | |
| PES4 | TPU4-A | 24.61% | 20.29% | slightly visible | slightly visible | slightly visible | 0.84 | 3 |
| | TPU4-B | 28.35% | 22.68% | not visible | slightly visible | slightly visible | 0.61 | 3 |
| PES5 | TPU5-A | | | | | | | |
| | TPU5-B | | | | | | | |
| PES6 | TPU6-A | 25.48% | 20.81% | slightly visible | slightly visible | slightly visible | 1.05 | 2 |
| | TPU6-B | 27.35% | 21.22% | not visible | slightly visible | slightly visible | 0.88 | 3 |
| PES7 | TPU7-A | | | | | | | |
| | TPU7-B | | | | | | | |
| PES8 | TPU8-A | 23.12% | 19.43% | not visible | slightly visible | slightly visible | 0.68 | 2 |
| | TPU8-B | 26.18% | 20.63% | not visible | slightly visible | slightly visible | 0.59 | 3 |

The results show that the inventive polyester siloxanes PES1 to PES8 could be transparently incorporated into TPUs. Moreover, the coefficient of friction could be markedly reduced. The high transparency and also the advantageous friction characteristics may be of particular significance for medical applications. It is clear from the change of the graph type to type 2 and even type 3 that the tackiness of the material has been markedly reduced. This property profile (reduced COF, no or low tackiness, high transparency) in thin layers is not known for unbranched linear structures. An additional advantage of the inventive compositions found was an improvement in the abrasion resistance, which in the case of parts that move against one another in medical technology or the automobile sector is important for a long lifetime of the components.

The invention claimed is:

1. A plastic composition, comprising:
   at least one plastic additive (A) selected from polyester-modified, branched organosiloxanes; and
   at least one plastic (B);
   wherein a proportion by mass of a total amount of the at least one plastic (B) is from >50.00% to 99.98%, based on a total mass of the plastic composition,
   wherein the at least one plastic additive (A) is selected from compounds of formula (1), $$M_m D_d T_t Q_q \qquad \text{formula (1);}$$

where
   $M=[R_3SiO_{1/2}]$;
   $D=[R_2SiO_{2/2}]$;
   $T=[RSiO_{3/2}]$;
   $Q=[SiO_{4/2}]$;
   in which
   R is in each case independently selected from the group consisting of $R^{(I)}$ and $R^{(II)}$;
   wherein
   $R^{(I)}$ is in each case independently selected from monovalent hydrocarbon radicals;
   $R^{(II)}$ is in each case independently selected from monovalent organic radicals each bearing one or more polyester radicals; and
   wherein
   $m=2+t+2\times q \geq 3$;
   $d \geq 0$;
   $t \geq 0$;
   $q \geq 0$;
   with the proviso that at least one radical $R^{(II)}$ is present.

2. The plastic composition according to claim 1, wherein the at least one plastic additive (A) is selected from compounds of formula (2), $$M_m D_d T_t Q_q \qquad \text{formula (2);}$$

where
   $M=[R_3SiO_{1/2}]$;
   $D=[R_2SiO_{2/2}]$;
   $T=[RSiO_{3/2}]$;
   $Q=[SiO_{4/2}]$;
   in which
   R is in each case independently selected from the group consisting of $R^{(I)}$ and $R^{(II)}$;
   wherein
   $R^{(I)}$ is in each case independently selected from monovalent hydrocarbon radicals;
   $R^{(II)}$ is in each case independently selected from monovalent organic radicals each bearing one or more polyester radicals; and
   wherein
   $m=2+t+2\times q=3$ to 60;
   $d=0$ to 120;
   $t=0$ to 10;

q=0 to 10;
with the proviso that the at least one plastic additive (A) has at least one radical $R^{(II)}$.

3. The plastic composition according to claim 1, wherein the at least one plastic additive (A) is selected from compounds of formula (3), $$M^1{}_{m1}M^2{}_{m2}D^1{}_{d1}D^2{}_{d2}T_tQ_q \qquad \text{formula (3);}$$

where
$M^1 = [R^1{}_3SiO_{1/2}]$;
$M^2 = [R^2R^1{}_2SiO_{1/2}]$;
$D^1 = [R^1{}_2SiO_{2/2}]$;
$D^2 = [R^1R^2SiO_{2/2}]$;
$T = [R^1SiO_{3/2}]$;
$Q = [SiO_{4/2}]$;
in which
$R^1$ is in each case independently selected from hydrocarbon radicals having 1 to 30 carbon atoms,
$R^2$ is in each case independently selected from monovalent organic radicals of formula (4), $$-R^3-(O-R^4)_p \qquad \text{formula (4);}$$

wherein
$R^3$ is in each case independently selected from (p+1)-valent organic radicals having 2 to 10 carbon atoms;
$R^4$ is in each case independently selected from monovalent polyester radicals having 4 to 1000 carbon atoms, and
wherein
m1=0 to 30;
m2=0 to 30;
d1=0 to 100;
d2=0 to 20;
t=0 to 10;
q=0 to 10;
p=1 to 4;
with the proviso that:
m1+m2=2+t+2×q=3 to 60; and
m2+d2=at least 1.

4. The plastic composition according to claim 3, wherein $R^4$ is in each case independently selected from the group consisting of polyester radicals of formulae (5a) or (5b), $$-[(C=O)-R^5-O-]_kR^6 \qquad \text{formula (5a),}$$

$$-[(C=O)-R^5-(C=O)-O-R^5-O-]_{(k/2)}R^6 \qquad \text{formula (5b),}$$

wherein
$R^5$ is in each case independently selected from divalent hydrocarbon radicals having 2 to 10 carbon atoms;
$R^6$ is in each case independently selected from the group consisting of H, an alkyl radical having 1 to 4 carbon atoms, and an acyl radical having 1 to 4 carbon atoms; and
k=2 to 50.

5. The plastic composition according to claim 1, wherein 5% to 50% of silicon atoms of the at least one plastic additive (A) bear one or more polyester radicals.

6. The plastic composition according to claim 3, wherein $R^3$ consists of two hydrocarbon radicals $R^{(a)}$ and $R^{(b)}$ and also an oxygen atom, wherein $R^{(a)}$ and $R^{(b)}$ are joined to one another via the oxygen atom, and wherein $R^{(a)}$ is bonded to a silicon atom and $R^{(b)}$ is not bonded to a silicon atom.

7. The plastic composition according to claim 6, wherein $R^{(a)}$ is a saturated or unsaturated hydrocarbon radical having 2 to 4 carbon atoms, and $R^{(b)}$ is a saturated hydrocarbon having 1 to 6 carbon atoms.

8. The plastic composition according to claim 1, wherein a proportion by mass of a total amount of the at least one plastic additive (A) is from 0.02% to <50.00%, based on a total mass of the plastic composition.

9. The plastic composition according to claim 1, wherein the at least one plastic (B) is selected from the group consisting of a thermoplastic and a thermoset.

10. The plastic composition according to claim 9, wherein
a) the thermoplastic is selected from the group consisting of acrylonitrile-butadiene-styrene (ABS), polyamide (PA), polylactate (PLA), poly(alkyl) (meth)acrylate, polymethyl methacrylate (PMMA), polycarbonate (PC), polyethylene terephthalate (PET), polyethylene (PE), polypropylene (PP), polystyrene (PS), polyether ether ketone (PEEK), polyvinyl chloride (PVC), and a thermoplastic elastomer (TPE); and/or
b) the thermoset is selected from the group consisting of a diallyl phthalate resin (DAP), an epoxy resin (EP), a urea-formaldehyde resin (UF), a melamine-formaldehyde resin (MF), a melamine-phenol-formaldehyde resin (MPF), a phenol-formaldehyde resin (PF), an unsaturated polyester resin (UP), a vinyl ester resin, and a polyurethane (PU).

11. A moulding compound or shaped body comprising the plastic composition according to claim 1.

12. A method, comprising:
producing an article with the plastic composition according to claim 1,
wherein the article is selected from the group consisting of a decorative covering panel; an add-on part; an interior component or exterior component in a motor vehicle, boat, aircraft, wind turbine blade, consumer electronic, or household appliance; a medical-technical product; a kitchen or laboratory work surface; a film; a fibre, a profile strip; a decorative strip; and a cable.

13. A method, comprising:
adding a polyester-modified, branched organosiloxane into the plastic composition of claim 1, as a plastic additive.

14. A method, comprising:
shaping, primary forming, or 3D printing an article with the plastic composition according to claim 1,
wherein the shaping is selected from the group consisting of deep drawing and thermoforming; and
wherein the primary forming is selected from the group consisting of primary forming from a liquid state and primary forming from a plastic state.

15. The method according to claim 14, wherein the primary forming is selected from the group consisting of gravity casting, die casting, low-pressure casting, centrifugal casting, dip moulding, primary forming of a fibre-reinforced plastic, compression moulding, injection moulding, transfer moulding, extrusion moulding, extrusion, drape forming, calendering, blow moulding, and modelling.

16. The plastic composition according to claim 8, wherein the proportion by mass of a total amount of the at least one plastic additive (A) is from 0.10% to 5.00%, based on the total mass of the plastic composition.

17. The plastic composition according to claim 10, wherein the thermoplastic elastomer is selected from the group consisting of a thermoplastic polyamide elastomer (TPA, TPE-A), a thermoplastic copolyester elastomer (TPC, TPE-E), a thermoplastic elastomer based on olefins (TPO, TPE-O), a thermoplastic styrene block copolymer (TPS, TPES), a thermoplastic polyurethane (TPU), a thermoplastic vulcanizate (TPV, TPE-V), and a crosslinked thermoplastic elastomer based on olefins (TPV, TPE-V).

18. The plastic composition according to claim 1, wherein the proportion by mass of a total amount of the at least one plastic (B) is from 95.00% to 99.90%, based on the total mass of the plastic composition.

\* \* \* \* \*